United States Patent
He et al.

(10) Patent No.: US 12,556,901 B2
(45) Date of Patent: Feb. 17, 2026

(54) METHODS, NETWORK FUNCTION NODES AND COMPUTER READABLE MEDIA FOR EVENT REPORT MANAGEMENT

(71) Applicant: Telefonaktiebolaget LM Ericsson (publ), Stockholm (SE)

(72) Inventors: Yingjiao He, Shanghai (CN); Hong Zhang, Gothenburg (SE); Susana Fernandez Alonso, Madrid (ES); Fuencisla Garcia Azorero, Madrid (ES); Yunjie Lu, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 303 days.

(21) Appl. No.: 18/555,995

(22) PCT Filed: Apr. 13, 2022

(86) PCT No.: PCT/CN2022/086578
§ 371 (c)(1),
(2) Date: Oct. 18, 2023

(87) PCT Pub. No.: WO2022/222823
PCT Pub. Date: Oct. 27, 2022

(65) Prior Publication Data
US 2024/0292203 A1    Aug. 29, 2024

(30) Foreign Application Priority Data

Apr. 20, 2021 (WO) ................ PCT/CN2021/088535

(51) Int. Cl.
*H04W 8/08* (2009.01)
(52) U.S. Cl.
CPC .................................... *H04W 8/08* (2013.01)

(58) Field of Classification Search
CPC ............ H04W 8/08; H04W 4/16; H04W 4/24; H04W 24/10; H04W 76/38; H04L 67/54;
(Continued)

(56) References Cited

U.S. PATENT DOCUMENTS

| 8,254,929 | B2 * | 8/2012 | Funabiki | ............... | H04W 4/029 |
| | | | | | 455/433 |
| 11,411,755 | B2 * | 8/2022 | Gardella | ................ | H04L 12/14 |

(Continued)

FOREIGN PATENT DOCUMENTS

| CN | 101199195 A | * | 6/2008 |
| CN | 104995867 A | | 10/2015 |

(Continued)

OTHER PUBLICATIONS

International Search Report and Written Opinion dated Jun. 2, 2022 for International Application No. PCT/CN2022/086578 filed Apr. 13, 2022, consisting of 7-pages.

(Continued)

*Primary Examiner* — Mahendra R Patel
(74) *Attorney, Agent, or Firm* — Weisberg I.P. Law, P.A.

(57) ABSTRACT

Methods for event report management in a network comprising a set of NF nodes, and corresponding NF nodes. The A method is implemented at a first NF node for providing an event exposure service for a User Equipment, UE, to a second NF node which subscribes the event exposure service includes starting a report mute guard timer upon receiving a first presence status report for the UE from a third NF node. The method includes avoiding a transmission of an event report to the second NF node while the report mute timer is running and transmitting an event report corresponding to a latest presence status report received during the running of the report mute guard timer to the second NF node when the report mute guard timer expires.

(Continued)

The present disclosure further provides corresponding NF nodes and computer readable medium.

18 Claims, 18 Drawing Sheets

(58) Field of Classification Search
CPC .. H04M 15/39; H04M 15/60; H04M 15/8033; H04M 15/8038; H04M 15/8278; H04M 15/888
USPC ...................................................... 455/422.1
See application file for complete search history.

(56) References Cited

U.S. PATENT DOCUMENTS

| | | | | |
|---|---|---|---|---|
| 11,595,797 | B2* | 2/2023 | Zhang | H04W 4/50 |
| 11,729,661 | B2* | 8/2023 | Iwai | H04L 65/80 370/235 |
| 11,963,167 | B2* | 4/2024 | Ahmed | H04L 1/1671 |
| 12,028,931 | B2* | 7/2024 | Zhou | H04W 8/08 |
| 2009/0119564 | A1* | 5/2009 | Sagfors | H04L 1/1854 714/748 |
| 2010/0254321 | A1* | 10/2010 | Kim | H04W 28/12 370/329 |
| 2013/0053055 | A1* | 2/2013 | Kumar | G01S 5/02521 455/456.1 |
| 2013/0159511 | A1* | 6/2013 | Backholm | H04L 41/0823 709/224 |
| 2017/0012829 | A1* | 1/2017 | Skaaksrud | H04B 17/318 |
| 2019/0253873 | A1* | 8/2019 | Shi | H04W 8/20 |
| 2019/0253917 | A1* | 8/2019 | Dao | H04W 76/27 |
| 2020/0107182 | A1* | 4/2020 | Chen | H04W 48/12 |
| 2020/0229069 | A1* | 7/2020 | Chun | H04W 76/30 |
| 2021/0007166 | A1* | 1/2021 | Liao | H04W 48/16 |
| 2022/0209903 | A1* | 6/2022 | Zhang | H04W 28/04 |

FOREIGN PATENT DOCUMENTS

| | | | | |
|---|---|---|---|---|
| CN | | 108012260 A | 5/2018 | |
| CN | | 111586583 A | 8/2020 | |
| EP | | 3627862 A1 | 3/2020 | |
| EP | | 3876637 A1 * | 9/2021 | ............ H04W 76/27 |
| KR | | 20200107182 A * | 9/2020 | ......... G06Q 30/0267 |
| WO | WO-2005076884 A2 * | | 8/2005 | ......... H04L 63/0853 |
| WO | WO-2014086431 A1 * | | 6/2014 | ......... H04L 41/0613 |

OTHER PUBLICATIONS

3GPP TS 29.512 V17.2.0; 3rd Generation Partnership Project; Technical Specification Group Core Network and Terminals; 5G System; Session Management Policy Control Service; Stage 3 (Release 17); Mar. 2021, consisting of 223-pages.

3GPP TS 32.291 V16.10.0; 3rd Generation Partnership Project; Technical Specification Group Services and System Aspects; Telecommunication management; Charging management; 5G system, charging service; Stage 3 (Release 16); Dec. 2021, consisting of 134-pages.

3GPP TS 29.518 V17.1.0; 3rd Generation Partnership Project; Technical Specification Group Core Network and Terminals; 5G System; Access and mobility Management Services; Stage 3 (Release 17); Mar. 2021, consisting of 313-pages.

3GPP TS 29.571 V17.1.0; 3rd Generation Partnership Project; Technical Specification Group Core Network and Terminals; 5G System; Common Data Types for Service Based Interfaces; Stage 3 (Release 17); Mar. 2021, consisting of 129-pages.

SA WG2 Meeting #125 S2-180274 (revision of S2-18); Change Request; Title: Clarification on the PRA support; Source to WG: Nokia, Nokia Shanghai Bell; Source to TSG: SA2; Work Item Code: 5GS_Ph1; Date and Location: Jan. 22-26, 2018, Gothenburg, Sweden, consisting of 12-pages.

3GPP TS 32.255 V17.1.0; 3rd Generation Partnership Project; Technical Specification Group Services and System Aspects; Telecommunication management; Charging management; 5G data connectivity domain charging; Stage 2 (Release 17); Mar. 2021, consisting of 122-pages.

Extended European Search Report dated Sep. 12, 2024 for Application No. 22790931.4, consisting of 17 pages.

ETSI TS 123 501 V16.5.1; 5G; System architecture for the 5G System (5GS) (3GPP TS 23.501 version 16.5.1 Release 16); Sep. 2020, consisting of 443 pages.

SA WG2 Meeting # 125 S2-180274; Title: Clarification on the PRA support; Source to WG: Nokia, Nokia Shanghai Bell; Date And Location: Jan. 22-26, 2018, Gothenburg, Sweden, consisting of 11 pages.

* cited by examiner

US 12,556,901 B2

METHODS, NETWORK FUNCTION NODES AND COMPUTER READABLE MEDIA FOR EVENT REPORT MANAGEMENT

CROSS-REFERENCE TO RELATED APPLICATIONS

This application is a Submission Under 35 U.S.C. § 371 for U.S. National Stage Patent Application of International Application No.: PCT/CN2022/086578, filed Apr. 13, 2022 entitled "METHODS, NETWORK FUNCTION NODES AND COMPUTER READABLE MEDIA FOR EVENT REPORT MANAGEMENT," which claims priority to International Application No.: PCT/CN2021/088535, filed Apr. 20, 2021, the entireties of both of which are incorporated herein by reference.

TECHNICAL FIELD

The present disclosure generally relates to the technical field of telecommunication, and particularly to methods and Network Function (NF) nodes for event report management in a network comprising a set of NF nodes and corresponding computer readable medium.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In Fifth Generation (5G) networks, a Network Slice is introduced as a logical network that provides specific network capabilities and network characteristics. An instance of a network slice (e.g. a network slice instance, NSI) is a set of Network Function (NF) instances and the required resources (e.g., computing, storage, and networking resources) which form a deployed Network Slice. An NF is a 3GPP adopted or 3GPP defined processing function in a network, which has defined functional behavior and 3GPP defined interfaces. An NF can be implemented either as a network element on dedicated hardware, a software instance running on a dedicated hardware, or as a virtualized functional instantiated on an appropriate platform, e.g., on a cloud infrastructure.

3GPP TS29.512, 4.2.6.5.6 describes PRA provision that the PCF shall provide the "praInfos" attribute within the SmPolicyDecision data structure. 3GPP TS29.512, 4.2.4.16 has described SMF performs Presence Reporting Area Information Report of the UE status and UE status change in PRA.

3GPP TS32.255, 5.1.7 describes CHF provision of UE Presence in Presence Reporting Area and SMF shall close current count containing UE presence in presence reporting area information either Immediate or deferred fashion.

3GPP TS32.291, 6.1.6.2.1.2 describes the presenceReportingAreaInformation in PDUSessionChargingInformation of ChargingDataResponse for CHF provision PRA information. 3GPP TS32.291, 6.1.6.2.9 describes the SMF reports the Presence Reporting Area status of UE during the used unit container interval.

3GPP TS29.518, 5.3.1 describes AMF EventExposure service for Event:
Presence-In-AOI-Report:
 Report Type: One-Time Report, Continuously Report
 Notification: UE-ID(s), Area identifier, Presence Status (IN/OUT/UNKNOWN/INACTIVE)

With above specification, if UE PRA is provisioned by PCF/CHF with Report Type Continuously, anytime when UE changes presence in presence reporting areas, AMF notifies the SMF of the UE status in Presence Reporting Area (IN/OUT/UNKNOWN/INACTIVE) and SMF will further notify PCF and CHF of the UE status in PRA for PCF and/or CHF policy and charging decision based on UE status in PRAs.

Each time UE status change in the subscribed PRAs will trigger a PRA report from AMF to SMF and further to PCF and/or CHF, and new policy and/or charging decisions based on UE status in PRA need to be enforced to the UPF and RAN as well as UE.

It can happen in a short time there are too frequent PRA reports over the network when the UE moves around at the border of multiple PRAs until the UE status in one PRA is stabilized. Policy and charging decisions provisioned from PCF and/or CHF for UE status change in PRA (if provisioned) need to be enforced during this unstable period may cause interfering signaling which may result service interruption for the UE. This generates too many signaling over the network in a short period.

SUMMARY

At least some objects of the present disclosure are to provide technical solutions capable of reporting a UE's presence state in a PRA when UE's presence state in a PRA is stabilized.

According to a first aspect of the present disclosure, there is provided a method implemented at a first network function node for providing an event exposure service for a User Equipment, UE, to a second NF node which subscribes the event exposure service. The method comprises starting a report mute guard timer upon receiving a first presence status report for the UE from a third NF node; avoiding a transmission of an event report to the second NF node while the report mute timer is running; and transmitting an event report corresponding to a latest presence status report received during the running of the report mute guard timer to the second NF node when the report mute guard timer expires.

In an exemplary embodiment, before the step of starting a report mute guard timer, the method further comprises: receiving an indicator indicating a value of the report mute guard timer from the second NF node. That is, the report mute guard timer may be provisioned by the second NF node.

In an exemplary embodiment, before the step of starting a report mute guard timer, the method further comprises: configuring the report mute guard timer at the first NF node locally. That is, the report mute guard timer may be locally configured at the first NF node.

In an exemplary embodiment, the step of starting a report mute guard timer upon receiving a first presence status report for the UE comprises: transmitting an event report corresponding to the first presence status report to the second NF node upon receiving the first presence status report for the UE. The step of avoiding a transmission of an event report to the second NF node while the report mute timer is running comprises: resetting the report mute guard timer upon receiving another presence status report for the event when the report mute guard timer is running, and avoiding a transmission of an event report corresponding to the other presence status report to the second NF node. The step of transmitting an event report corresponding to a latest presence status report received during the running of the report mute guard timer to the second NF node when the report mute guard timer expires comprises: transmitting the event report corresponding to the latest presence status report received during the running of the report mute guard timer to the second NF node when the first presence status report and the latest presence status report indicate different presence states of the UE. There is provided another way of using the report mute guard timer.

In an exemplary embodiment, the step of transmitting an event report corresponding to a latest presence status report received during the running of the report mute guard timer to the second NF node comprises: transmitting an event report comprising an event report stable time, wherein the event report stable time is a length of time from starting of the report mute guard timer to expiration of the report mute guard timer.

In an exemplary embodiment, the step of transmitting an event report corresponding to a latest presence status report received during the running of the report mute guard timer to the second NF node comprises: transmitting an event report comprising a number of suppressed event reports, wherein the number of suppressed event reports is equal to a number of presence status reports for the UE received during the running of the report mute guard timer.

In an exemplary embodiment, the first NF node is an Access and Mobility Management Function, AMF, node, or a Session Management Function, SMF, node.

In an exemplary embodiment, the second NF node is a Policy Control Function, PCF, node, or a Charging Function, CHF, node.

In an exemplary embodiment, when more than one indicator indicating a different value of the report mute guard timer is received from more than one second NF node, the value of the report mute guard timer used for the event report is the smallest one of the values.

In an exemplary embodiment, when an indicator indicating a value of the report mute guard timer is received from the second NF node, and a report mute guard timer is locally configured at the first NF node, which timer is used for the event report is determined at least partially based on an operator policy if configured in the first NF node.

In an exemplary embodiment, the report mute guard timer locally configured at the first NF node is used when the first NF node receives an indication from the second NF node that the event report shall be performed when a presence state for the UE is stabilized.

In an exemplary embodiment, the presence status report indicates a presence state of the UE in a Presence Reporting Area, PRA, and is received when the presence state of the UE in a PRA changes, and the event report is a PRA report.

In an exemplary embodiment, the report mute guard timer is provided for:
  each PRA,
  all PRAS,
  per UE or a group or UE, or
  per Public Data Network, PDN.

According to a second aspect of the present disclosure, there is provided a method implemented at a first network function node for providing an event exposure service for a User Equipment, UE, to a second NF node which subscribes the event exposure service. The method comprises: receiving from the second NF node an event filtering indicator indicating a presence state of the UE which triggers an event report to the second NF node; in response to receiving a presence status report of the UE from a third NF node, matching a presence state of the UE indicated by the presence status report with the presence state of the UE indicated by the event filtering indicator, and transmitting an event report corresponding to the presence status report to the second NF when the present state of the UE indicated by the presence status report matches with the presence state of the UE indicated by the event filtering indicator.

In an exemplary embodiment, the event filtering indicator is an event filtering list listing more than one presence state of the UE which triggers an event report to the second NF node.

In an exemplary embodiment, the presence status report indicates a presence state of the UE in a Presence Reporting Area, PRA, and the presence state of the UE comprises one or more of the following:
  the UE is inside or enters the PRA;
  the UE is outside or leaves the PRA;
  it is unknown whether the UE is in the PRA or not; or
  the PRA is inactive in the third NF node.

In an exemplary embodiment, the first NF node is an Access and Mobility Management Function, AMF, node, or a Session Management Function, SMF, node.

In an exemplary embodiment, the second NF node is a Policy Control Function, PCF, node, or a Charging Function, CHF, node.

According to a third aspect of the present disclosure, there is provided a method implemented at a second network function node for managing an event report for an event exposure service for a User Equipment, UE, from a first NF node which provides the event exposure service. The method comprises: transmitting an indicator to the first NF node indicating that the second NF node supports a report mute feature.

In an exemplary embodiment, the step of transmitting an indicator to the first NF node indicating that the second NF node supports a report mute feature comprises: transmitting an indicator indicating a value of a report mute guard timer for the event report to the first NF node.

In an exemplary embodiment, the step of transmitting an indicator to the first NF node indicating that the second NF node supports a report mute feature comprises: transmitting an indication that the event report shall be performed when a presence state for the UE is stabilized.

In an exemplary embodiment, the method further comprises receiving from the first NF node an event report comprising a number of suppressed event reports, wherein the number of suppressed event reports is equal to a number of event reports for the UE that otherwise would be transmitted from the first NF without the report mute feature.

In an exemplary embodiment, the event report further comprises an event report stable time, wherein the event report stable time is a length of time from the time when the first NF node transmits a previous event report to the time when the first NF node transmits the current event report.

In an exemplary embodiment, the event report is a Presence Reporting Area, PRA, report.

In an exemplary embodiment, the report mute guard timer is provided for:
  each PRA,
  all PRAs,
  per UE or a group or UE, or
  per Public Data Network, PDN.

In an exemplary embodiment, the first NF node is an Access and Mobility Management Function, AMF, node, or a Session Management Function, SMF, node.

In an exemplary embodiment, the second NF node is a Policy Control Function, PCF, node, or a Charging Function, CHF, node.

According to a fourth aspect of the present disclosure, there is provided a method implemented at a second network function node for managing an event report for an event exposure service for a User Equipment, UE, from a first NF node which provides the event exposure service. The method comprises: transmitting to the first NF node an event filtering indicator indicating a presence state of the UE which triggers the event report to the second NF node.

In an exemplary embodiment, the event filtering indicator is an event filtering list listing more than one presence state of the UE which trigger an event report to the second NF node.

In an exemplary embodiment, the presence state of the UE is a presence state of the UE in a Presence Reporting Area, PRA, and the presence state of the UE comprises one or more of the following:

the UE is inside or enters the PRA;
the UE is outside or leaves the PRA;
it is unknown whether the UE is in the PRA or not; or
the PRA is inactive in the third NF node.

In an exemplary embodiment, the first NF node is an Access and Mobility Management Function, AMF, node, or a Session Management Function, SMF, node.

In an exemplary embodiment, the second NF node is a Policy Control Function, PCF, node, or a Charging Function, CHF, node.

According to fifth aspect of the present disclosure, a first NF node is provided, comprising: a communication interface arranged for communication, at least one processor, and a memory comprising instructions which, when executed by the at least one processor, cause the first NF node to perform the first and/or second aspects said above.

According to sixth aspect of the present disclosure, a second NF node is provided, comprising: a communication interface arranged for communication, at least one processor, and a memory comprising instructions which, when executed by the at least one processor, cause the second NF node to perform the third and/or fourth aspects said above.

According to seventh aspect of the present disclosure, there is provided a computer program comprising instructions which, when executed by at least one processor, cause the at least one processor to carry out the methods for event report management as discussed previously.

According to eighth aspect of the present disclosure, there is provided a carrier containing the computer program discussed above, wherein the carrier is one of an electronic signal, optical signal, radio signal, or computer readable storage medium.

According to the above technical solutions of the present disclosure, the first NF node may be provided with a report mute guard timer, which is either locally configured at the first NF node or provisioned by the second NF node. The first NF node avoids the transmission of any event report to the second NF node when the report mute guard timer is running. Accordingly, when the UE is for example at a border of PRA1 and PRA2 and the first NF node, for example, AMF node, frequently receives a presence status report for the UE from the RAN, the first NF node will not transmit a notification to the PCF or CHF via the SMF when the report mute guard timer is running. So the PCF or CHF will not be frequently triggered to determine a new policy, which new policy may be not appropriate when the UE presence state changes rapidly. Accordingly, UE's presence state in a PRA is reported when UE presence state in a PRA stabilized and new policy and charging decisions are provisioned based on the PRA can be enforced. During the period the UE is moving around the border of multiple PRAs the PCF and/or CHF knows it, so that PCF and/or CHF may decide the policy and/or charging decisions to apply based on locally configured policies. Furthermore, PCF and/or CHF can optionally provide a reporting condition for filtering out the presence state(s) that trigger a PRA change event report. Therefore PCF and/or CHF can be reported with UE's presence state the PCF and/or CHF want to be notified.

BRIEF DESCRIPTION OF THE DRAWINGS

The objects, advantages and characteristics of the present disclosure will be more apparent, according to descriptions of preferred embodiments in connection with the drawings, on which.

Figure 1:
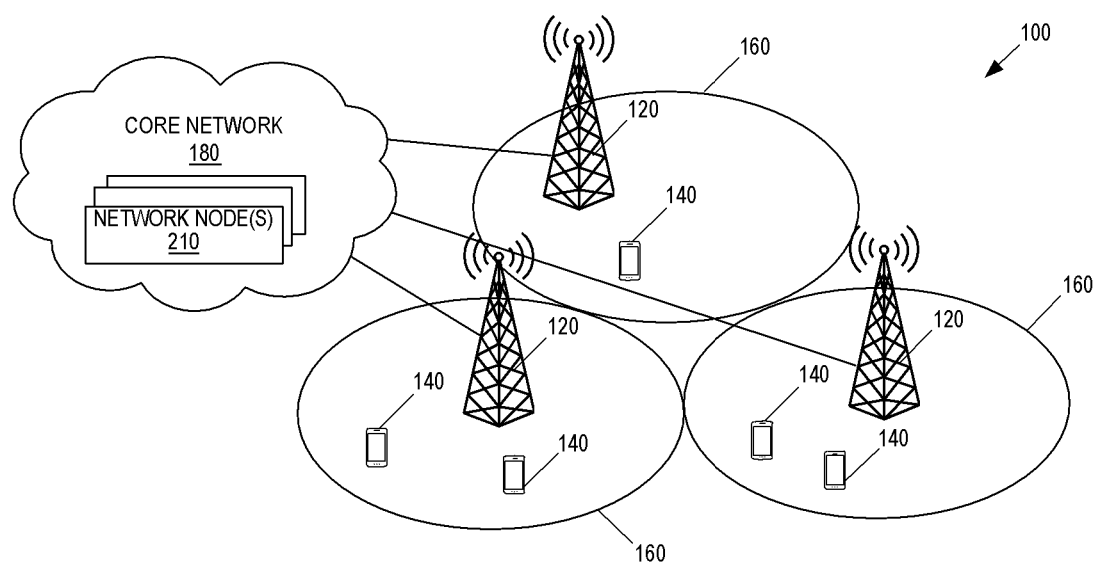
FIG. 1 illustrates one example of a wireless communication system in which embodiments of the present disclosure may be implemented.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in references as follows:

1) 3GPP TS29.512, V17.2.0, (2021-04),
2) 3GPP TS32.291, V16.7.0, (2121-04),
3) 3GPP TS29.571, V17.1.0 (2021-03),
4) 3GPP TS29.518, V17.1.0 (2021-03), and
5) 3GPP TS32.255, V17.1.1, (2021-04)

References in this specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of the skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single Carrier-Frequency Division Multiple Access (SC-FDMA), Long Term Evolution (LTE), New Radio (NR) and other networks developed in the future. The terms "network" and "system" are sometimes used interchangeably. For illustration only, certain aspects of the techniques are described below for the 5th generation of wireless communication network. However, it will be appreciated by the skilled in the art that the techniques described herein may also be used for other wireless networks such as LTE and corresponding radio technologies mentioned herein as well as wireless networks and radio technologies proposed in the future.

As used herein, the term "UE" may be, by way of example and not limitation, a User Equipment (UE), a SS (Subscriber Station), a Portable Subscriber Station (PSS), a Mobile Station (MS), a Mobile Terminal (MT) or an Access Terminal (AT). The UE may include, but not limited to, mobile phones, cellular phones, smart phones, or personal digital assistants (PDAs), portable computers, image capture terminal devices such as digital cameras, gaming terminal devices, music storage and playback appliances, wearable terminal devices, vehicle-mounted wireless terminal devices and the like. In the following description, the terms "UE", "terminal device", "mobile terminal" and "user equipment" may be used interchangeably.

FIG. 1 illustrates one example of a wireless communication system 100 in which embodiments of the present disclosure may be implemented. The wireless communication system 100 may be a cellular communications system such as, for example, a 5G New Radio (NR) network or an LTE cellular communications system. As illustrated, in this example, the wireless communication system 100 includes a plurality of radio access nodes 120 (e.g., evolved Node B:s (eNBs), 5G base stations which are referred to as gNBs, or other base stations or similar) and a plurality of wireless communication devices 140 (e.g., conventional UEs, Machine Type Communication (MTC)/Machine-to-Machine (M2M) UEs). The wireless communication system 100 is organized into cells 160, which are connected to a core network 180 via the corresponding radio access nodes 120. The radio access nodes 120 are capable of communicating with the wireless communication devices 140 (also referred to herein as communication device 140 or UEs 140) along with any additional elements suitable to support communication between wireless communication devices or between a wireless communication device and another communication device (such as a landline telephone). The core network 180 includes one or more network node(s) or function(s) 210. In some embodiments, the network nodes/functions 210 may comprise, for example, any of the network functions shown in FIGS. 2-3.

Figure 2:
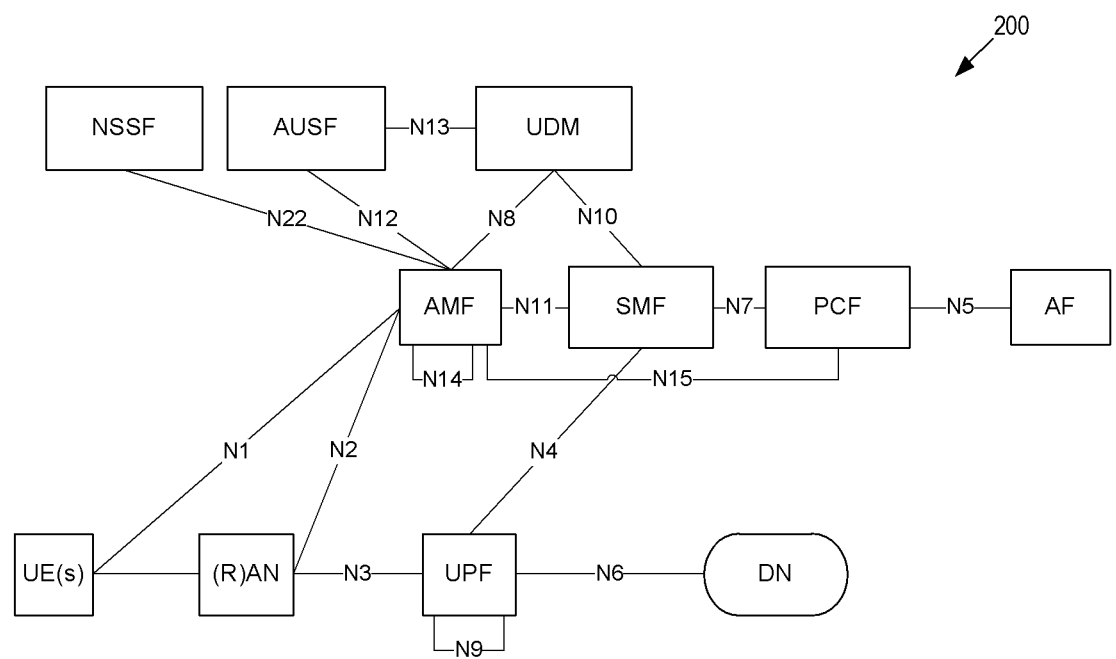
FIG. 2 illustrates a wireless communication system represented as a 5G network architecture composed of core NFs.

FIG. 2 illustrates a wireless communication system 200 represented as a 5G network architecture composed of core NFs, where interaction between any two NFs is represented by a point-to-point reference point/interface.

Seen from the access side the 5G network architecture shown in FIG. 2 comprises a plurality of User Equipment (UEs) connected to either a Radio Access Network (RAN) or an Access Network (AN) directly as well as an Access and Mobility Management Function (AMF) indirectly, for example, via the RAN or AN. Typically, the (R)AN comprises base stations, e.g. such as evolved Node B:s (eNBs) or 5G base stations (gNBs) or similar. Seen from the core network side, the 5G core NFS shown in FIG. 2 include a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF), and a User Plane Function (UPF).

Reference point representations of the 5G network architecture are used to develop detailed call flows in the normative standardization. The N1 reference point is defined to carry signaling between UE and AMF. The reference points for connecting between AN and AMF and between AN and UPF are defined as N2 and N3, respectively. There is a reference point, N11, between AMF and SMF, which implies that SMF is at least partly controlled by AMF. N4 is used by SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since PCF applies policy to AMF and SMF, respectively. N12 is required for the AMF to perform authentication of the UE. N8 and N10 are defined because the subscription data of UE is required for AMF and SMF.

The 5G core network aims at separating user plane and control plane. The user plane carries user traffic while the control plane carries signaling in the network. In FIG. 2, the UPF is in the user plane and all other NFs, i.e., AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
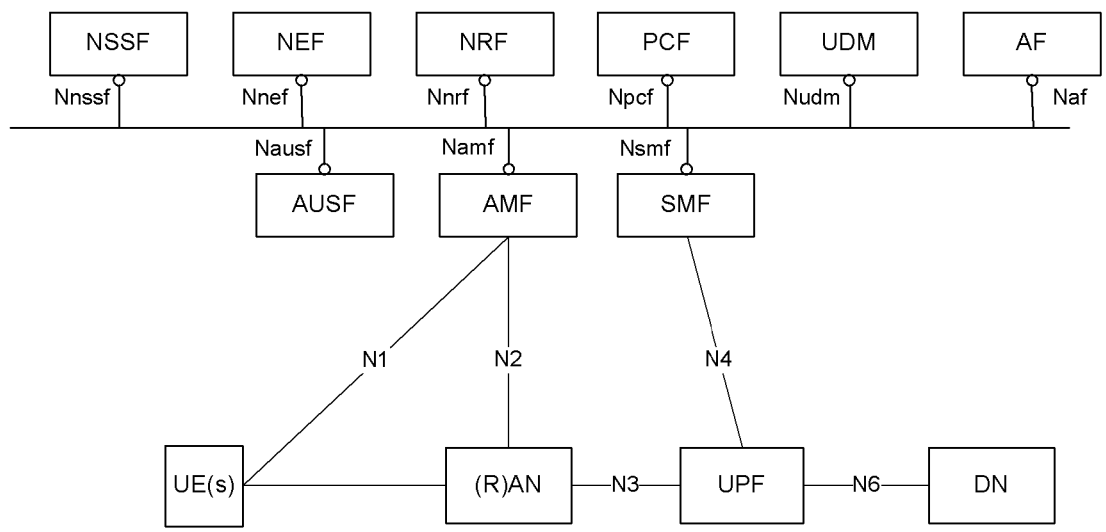
FIG. 3 illustrates a 5G network architecture using service-based interfaces between the NFs in the control plane, instead of the point-to-point reference points/interfaces used in the 5G network architecture of FIG. 2.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF and Nsmf for the service based interface of the SMF etc. The Network Exposure Function (NEF) and the Network Function Repository Function (NRF) in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2-3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates IP addresses to UEs. It also selects and controls the UPF for data transfer. If a UE has multiple sessions, different SMFs may be allocated to each session to manage them individually and possibly provide different functionalities per session. The AF provides information on the packet flow to PCF responsible for policy control in order to support Quality of Service (QOS). Based on the information, PCF determines policies about mobility and session management to make AMF and SMF operate properly. The AUSF supports authentication function for UEs or similar and thus stores data for authentication of UEs or similar while UDM stores subscription data of UE. The Data Network (DN), not part of the 5G core network, provides Internet access or operator services and similar.

An NF may be implemented either as a network element on a dedicated hardware, as a software instance running on a generic hardware, or as a virtualized function instantiated on an appropriate platform, e.g., a cloud infrastructure.

The Nudm_EventExposure service is used by consumer NFs (e.g. NEF) to subscribe to notifications of event occurrence by means of the Subscribe service operation. For events that can be detected by the AMF, the UDM makes use of the appropriate AMF service operation to subscribe on behalf of the consumer NF (e.g. NEF).

Figure 4:
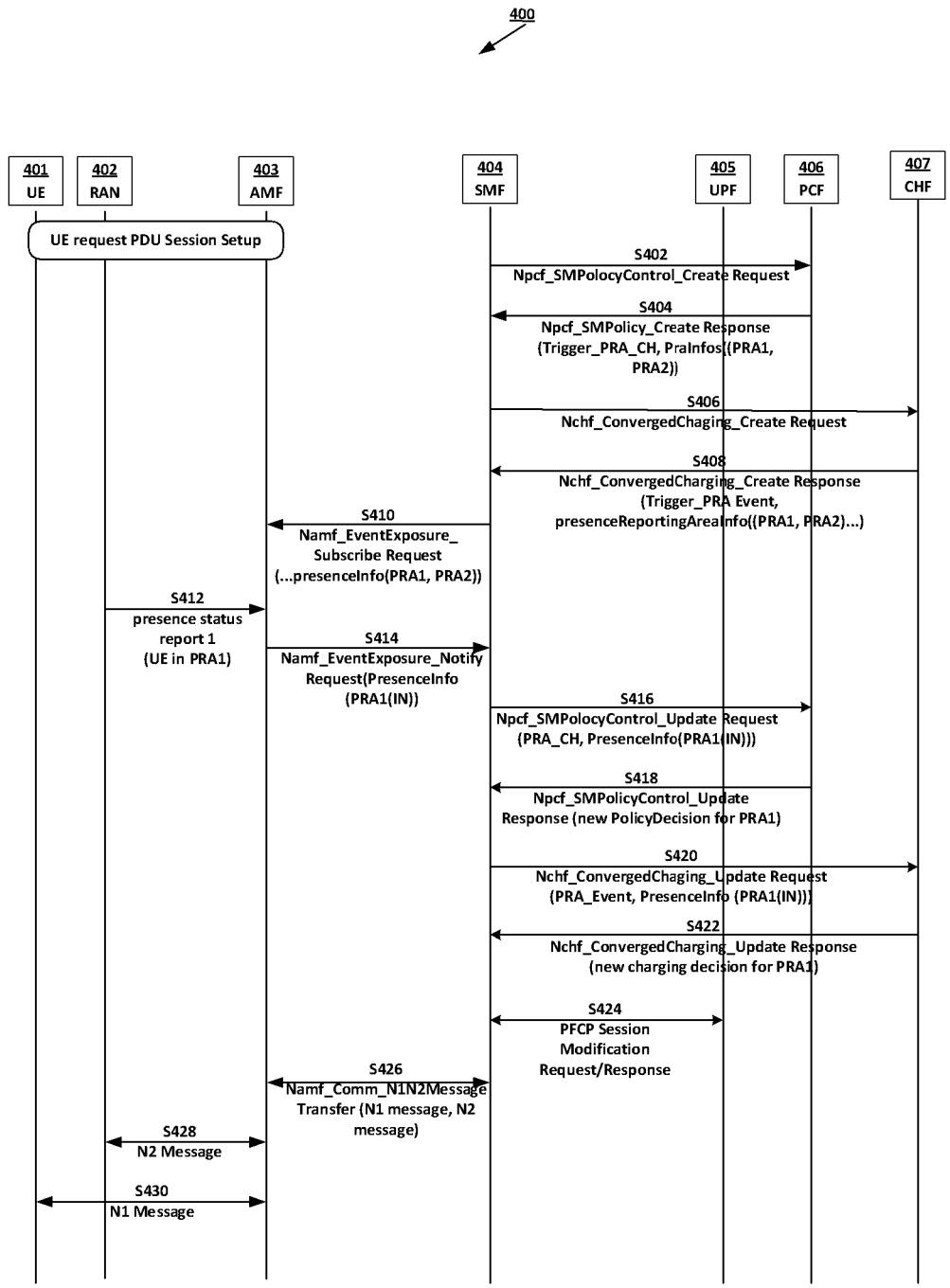
FIG. 4 illustrates a scenario where each time UE status change in a subscribed PRA will trigger a PRA report from AMF to SMF and further to PCF and/or CHF, and new policy and/or charging decisions are enforced to the UPF and RAN as well as UE.

FIG. 4 illustrates a scenario where each time UE status changes in a subscribed PRA will trigger a PRA report from AMF to SMF and further to PCF and/or CHF, and new policy and/or charging decisions are enforced to the UPF and RAN as well as UE.

The scenario shown in FIG. 4 involves a UE 401, a RAN 402, an AMF 403, a SMF 404, a UPF 405, a PCF 406 and a CHF 407. It is only an example and the real scenario is not limited thereto.

First of all, UE 401 request a PDU session setup to AMF 403, and the PRAs are provisioned by PCF 406 and/or CHF 407.

In steps S402 and S404, PCF 406 interacts with SMF 404 to indicate that it shall be reported when UE presence state in PRA1 and PRA2 changes. In steps S406 and S408, CHF 407 interacts with SMF 404 to indicate that it shall be reported when UE presence state in PRA1 and PRA2 changes.

In step S410, SMF 404 subscribes to AMF 403 for UE presence state in PRA1 and PRA2.

In step S412, RAN 402 reports UE presence state to AMF 403, that is, UE 401 is in PRA1.

In step S414, AMF 403 notifies SMF 404 of the UE presence state in PRA1.

In steps S416 and 418, SMF 404 notifies PCF 406 of the UE presence state in PRA1, and PCF 406 decides a new policy for UE in PRA1. In steps S420 and S422, SMF 404 notifies CHF 407 of the UE presence state in PRA1, and CHF 407 decides a new charging decision for UE in PRA1.

In steps S424~S430, the new policy/charging decision is enforced to UPF 405, RAN 402 and UE 401.

In case that UE moves at the border of PRA1 and PRA2, and when RAN 402 reports a new UE presence state to AMF 403, for example, UE is now in PRA2 and out of PRA1, steps S414 to S430 will repeat once again. Each time UE's presence status in PRAs changes, it results signals over the network. It may also result the interfering and conflicting procedure while SMF is enforcing a new policy and charging decision to UPF/RAN/UE and at the mean time UE presence state in PRAs has changed results a new PRA report.

Hereinafter, a method for event report management in a network comprising a set of NF nodes according to an exemplary embodiment of the present disclosure will be described with reference to FIGS. 5A-15.

Figure 5A:
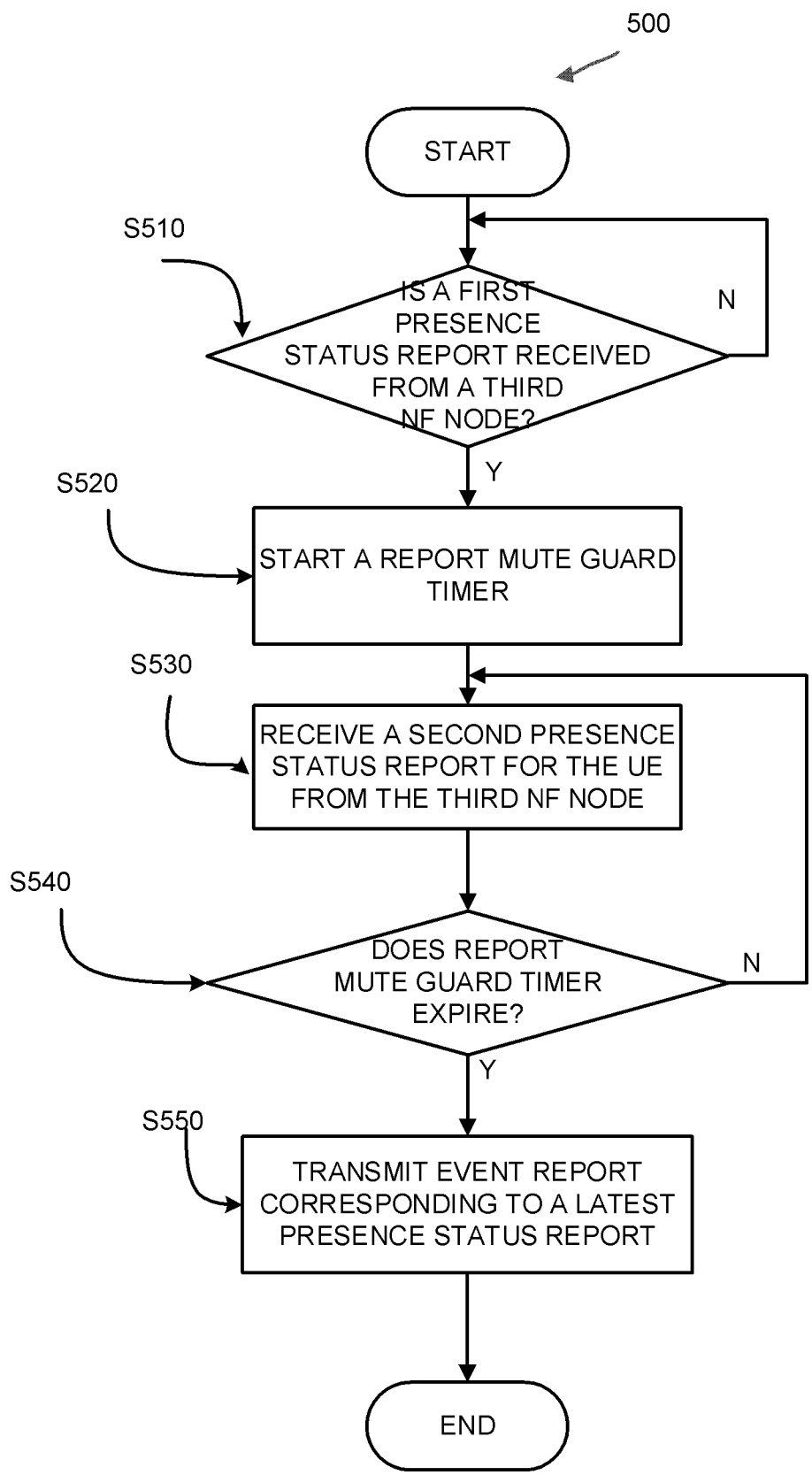
FIG. 5A illustratively shows a flowchart of a method 500 for managing an event report according to an exemplary embodiment of the present disclosure.

FIG. 5A illustratively shows a flowchart of a method 500 for managing an event report according to an exemplary embodiment of the present disclosure. In an embodiment, the method 500 may be performed at a first Network Function (NF) node for providing an event report for an event exposure service for a UE to a second NF node. The first NF node may be, for example, an AMF node or a SMF node. The second NF node may be, for example, a PCF node or a CHF node.

As shown in FIG. 5A, the method 500 may include steps S510~S550.

The method starts in step S510, where a first presence status report for the UE is received from a third NF node. In case that the event report is an event report for an event exposure service, the third NF node may be a RAN. The third NF node may also be NWDAF, NEF servers if the concepts of guard timer and praFilters (described below) are extended to other event types.

Then the method comprises a step S520 of starting a report mute guard timer.

If a second presence status report for the UE is received from the third NF node at step S530, it is checked whether the report mute guard timer expires or not in step S540. A transmission of an event report to the second NF node will be avoided while the report mute timer is running. Accordingly, if it is checked out that the report mute guard timer does not expire, the method turns to step S530 to avoid any transmission of event report. If it is checked out that the report mute guard timer expires in step S540, the method proceeds to step S550 to transmit an even report corresponding to a latest presence status report received during the running of the report mute guard timer to the second NF node.

In an exemplary embodiment of the present disclosure, the method may further comprise a step of receiving an indicator indicating a value of the report mute guard timer from the second NF node. That is, the report mute guard timer is provisioned by the second NF node. It allows the second NF node (e.g., PCF and/or CHF) centrally controls if the event report shall be muted for a period or not with the report mute guard timer.

In an exemplary embodiment of the present disclosure, the method may further comprise a step of configuring the report mute guard timer at the first NF node. That is, the report mute guard timer is locally configured at the first NF node.

In an exemplary embodiment of the present disclosure, the report mute guard timer is locally configured at the first NF node and an indicator indicating a value of the report mute guard timer is received from the second NF node, that is, there are at least two report mute guard timers. In such case, which of the two timers is used for the event report is determined at least partially based on an operator policy if configured in the first NF node.

In an exemplary embodiment of the present disclosure, the first NF node does not transmit an event report to the second NF node when the report mute guard timer is running, and it counts the suppressed event report. When the first NF node transmits the event report corresponding to a latest presence status report received during the running of the report mute guard timer, it includes a number of suppressed event reports in the event report. The number of suppressed event reports is equal to a number of presence status reports for the UE received during the running of the report mute guard timer.

In an exemplary embodiment of the present disclosure, there is more than one second NF node that indicates different value of the report mute guard timer, the value of the report mute guard timer used for the event report is the smallest one of the timers.

In an exemplary embodiment of the present disclosure, the first NF node receives an indication from the second NF node that the event report shall be performed when a presence state for the UE is stabilized. The first NF node uses the locally configured report mute guard timer upon receiving such an indication.

In an exemplary embodiment of the present disclosure, the presence status report indicates a presence state of the UE in a PRA and is received when the presence state of the UE in a PRA changes. The event report is a PRA report.

In an exemplary embodiment of the present disclosure, the report mute guard timer can be provided for each PRA, all PRAs, per UE or a group of UE, or per Public Data Network, PDN. For example, the report mute guard timer either locally configured at the first NF node or provisioned by the second NF node may be different for each PRA, or the same for all PRAs. As another example, the report mute guard timer either locally configured at the first NF node or provisioned by the second NF node may be different for each UE, or the same for a group of UEs.

According to the embodiment, the first NF node avoids the transmission of any event report to the second NF node when the report mute guard timer is running. Accordingly, when the UE is for example at a border of PRA1 and PRA2 and the first NF node, for example, AMF node, frequently receives a presence status report for the UE from the RAN, the first NF node will not transmit a notification to the PCF or CHF via the SMF when the report mute guard timer is running. So the PCF or CHF will not be frequently triggered to determine a new policy, which new policy may be not appropriate when the UE presence state changes rapidly.

There may be many ways to use the report mute guard timer either locally configured or provisioned by the second NF node. As an example, there is provided another embodiment in conjunction with FIG. 5B.

Figure 5B:
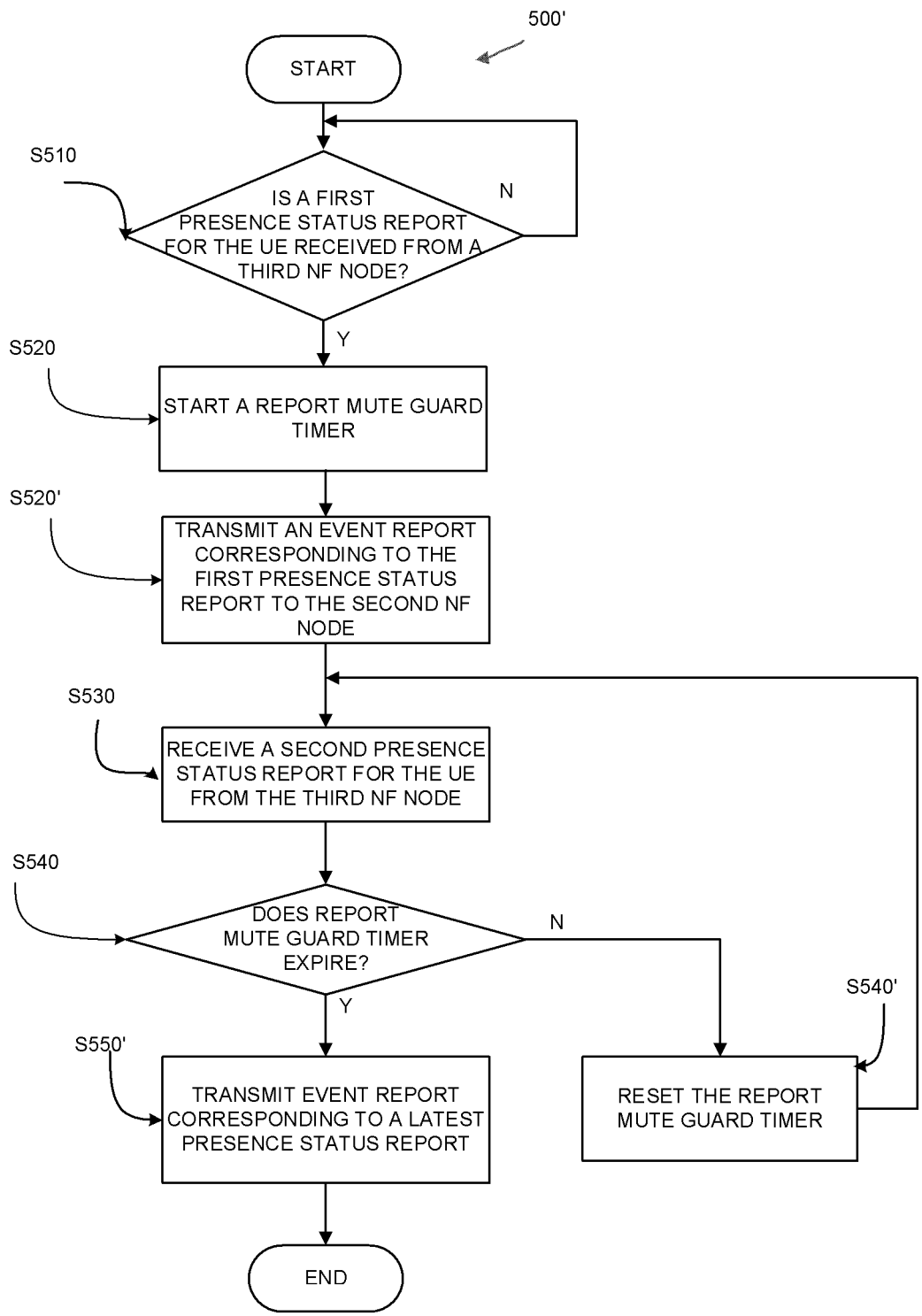
FIG. 5B illustratively shows a flowchart of a method 500' for managing event report according to an exemplary embodiment of the present disclosure.

FIG. 5B illustratively shows a flowchart of a method 500' for managing event report according to an exemplary embodiment of the present disclosure. In an embodiment, the method 500' may be performed at a first Network Function (NF) node for providing an event report for an event exposure service for a UE to a second NF node. The first NF node may be, for example, an AMF node or a SMF node. The second NF node may be, for example, a PCF node or a CHF node.

It can be seen from FIG. 5B that it differs from the embodiment described in conjunction with FIG. 5A in that there are steps S520', S540' in addition to the steps S510 to S550 in FIG. 5A, and there is a step S550' instead of step S550 in FIG. 5A.

The method starts in step S510, where a first presence status report for the UE is received from a third NF node. In case that the event report is an event report for an event exposure service, the third NF node may be a RAN. The third NF node may also be NWDAF, NEF servers if the concepts of guard timer and praFilters (described below) are extended to other event types.

Then the method comprises a step S520 of starting a report mute guard timer.

The method further comprises a step S520' of transmitting an event report corresponding to the first presence status report to the second NF node.

If a second presence status report for the UE is received from the third NF node at step S530, it is checked whether the report mute guard timer expires or not in step S540. A transmission of an event report to the second NF node will be avoided while the report mute timer is running. Accordingly, if it is checked out that the report mute guard timer does not expire, the method proceeds to step S540' to reset the report mute guard timer, and then turns to step S530 to avoid any transmission of event report. If it is checked out that the report mute guard timer expires in step S540, the method proceeds to step S550' to transmit an even report corresponding to a latest presence status report received during the running of the report mute guard timer to the second NF node. In step S550', the latest presence status report is compared with the first presence status report, and the event report corresponding to the latest presence status report is transmitted only if the latest present status report and the first presence status report indicate different presence states of the UE.

In an exemplary embodiment of the present disclosure, the first NF node does not transmit an event report to the second NF node when the report mute guard timer is running, and it resets the report mute guard timer upon receiving a presence status report while the repot mute guard timer is running. When the first NF node transmits the event report corresponding to a latest presence status report received during the running of the report mute guard timer, it includes an event report stable time in the event report. The event report stable time is a length of time from starting of the report mute guard timer to expiration of the report mute guard timer.

According to the embodiment, the first NF node avoids the transmission of any event report to the second NF node when the report mute guard timer is running. Accordingly, when the UE is for example at a border of PRA1 and PRA2 and the first NF node, for example, AMF node, frequently receives a presence status report for the UE from the RAN, the first NF node will not transmit a notification to the PCF or CHF via the SMF when the report mute guard timer is running. So the PCF or CHF will not be frequently triggered to determine a new policy, which new policy may be not appropriate when the UE presence state changes rapidly. Furthermore, by resetting the report mute guard timer each time a presence status report is received while the report mute guard timer is running, it may only transmit an event report to the second NF node if the UE's presence state has not changed for the time length of the report mute guard timer, i.e., UE presence state is stable for the time length of the report mute guard timer.

Figure 6:
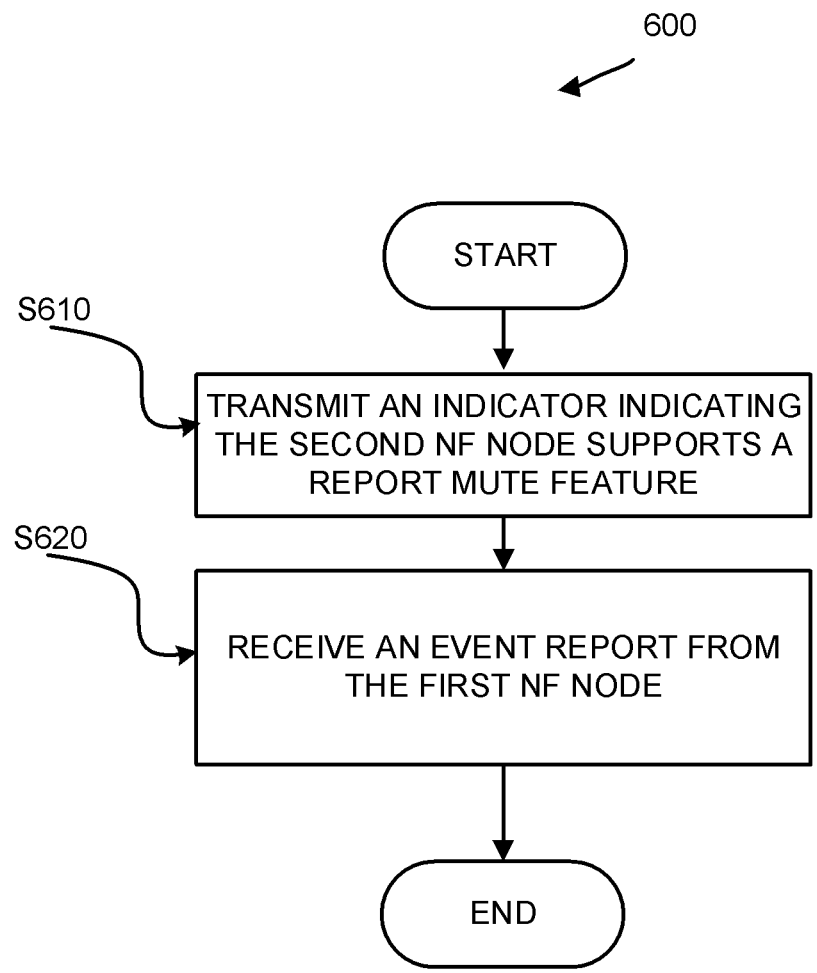
FIG. 6 illustratively shows a flowchart of a method 600 for managing an event report for an event exposure service for a UE according to an exemplary embodiment of the present disclosure.

FIG. 6 illustratively shows a flowchart of a method 600 for managing an event report for an event exposure service for a UE according to an exemplary embodiment of the present disclosure. In an embodiment, the method 600 may be performed at a second NF node. The second NF node may be, for example, a PCF node or a CHF node. The even report is provided from a first NF node which provides the event exposure service. The first NF node may be, for example, an AMF node or a SMF node.

As shown in FIG. 6, the method 600 may include steps S610~S620.

The method starts in step S610, where the second NF node transmits an indicator indicating that the second NF node supports a report mute feature to the first NF node.

In an exemplary embodiment of the present disclosure, the indicator may be an indicator indicating a value of a report mute guard timer for the event report. By provisioning explicitly a report mute guard timer, the first NF node knows that the second NF node supports a report mute feature, and may provide an event report by applying the report mute guard timer. In an exemplary embodiment of the present disclosure, the report mute guard timer is provided for each PRA, all PRAs, per UE or a group or UE, or per Public Data Network, PDN.

In an exemplary embodiment of the present disclosure, the indicator may be an indication that the event report shall be performed when a presence state for the UE is stabilized. By providing such an indication, the first NF node knows that the second NF node supports a report mute feature, and may provide an event report by applying a report mute guard timer that is locally configured at the first NF node.

In an exemplary embodiment of the present disclosure, the indicator may comprise an indicator indicating a value of a report mute guard timer for the event report and an indication that the event report shall be performed when a presence state for the UE is stabilized. It depends on the first NF node to decide which of the report mute guard timer provisioned by the second NF node and the locally configured report mute guard timer to use based on an operator policy configured in the first NF node.

The method further comprises a step S620 of receiving an event report from the first NF node.

In an exemplary embodiment of the present disclosure, the event report comprises a number of suppressed event reports, wherein the number of suppressed event reports is equal to a number of event reports for the UE that otherwise would be transmitted from the first NF without the report mute feature. The second NF node can use the number of suppressed event reports in for example, network tuning and network planning.

In an exemplary embodiment of the present disclosure, the event report further comprises an event report stable time, wherein the event report stable time is a length of time from the time when the first NF node transmits a previous event report to the time when the first NF node transmits the current event report. The second NF node can use the number of suppressed event reports in for example, network tuning and network planning.

In an exemplary embodiment of the present disclosure, the event report is a Presence Reporting Area, PRA, report.

The event report mute timer, event report stable time and number of suppressed report concept can be applied to any other Event type reports with report-type periodic and continuous (e.g., Location-Report, UEs-In-Area-Report, Reachability-Report) to network statistics and analytics function.

According to the embodiment, the second NF node indicates that it supports a report mute feature, and the first NF node may provide an event report by taking the report mute feature into account. For example, the first NF node avoids the transmission of any event report to the second NF node when the report mute guard timer (either provisioned by the second NF node or locally configured at the first NF node) is running. Accordingly, when the UE is for example at a border of PRA1 and PRA2 and the first NF node, for example, AMF node, frequently receives a presence status report for the UE from the RAN, it will not transmit a notification to the PCF or CHF via the SMF when the report mute guard timer is running. So the PCF or CHF will not be frequently triggered to determine a new policy, which new policy may be not appropriate when the UE presence stats changes rapidly.

The inventive concept can be applied to EPS as well.

Figure 7:
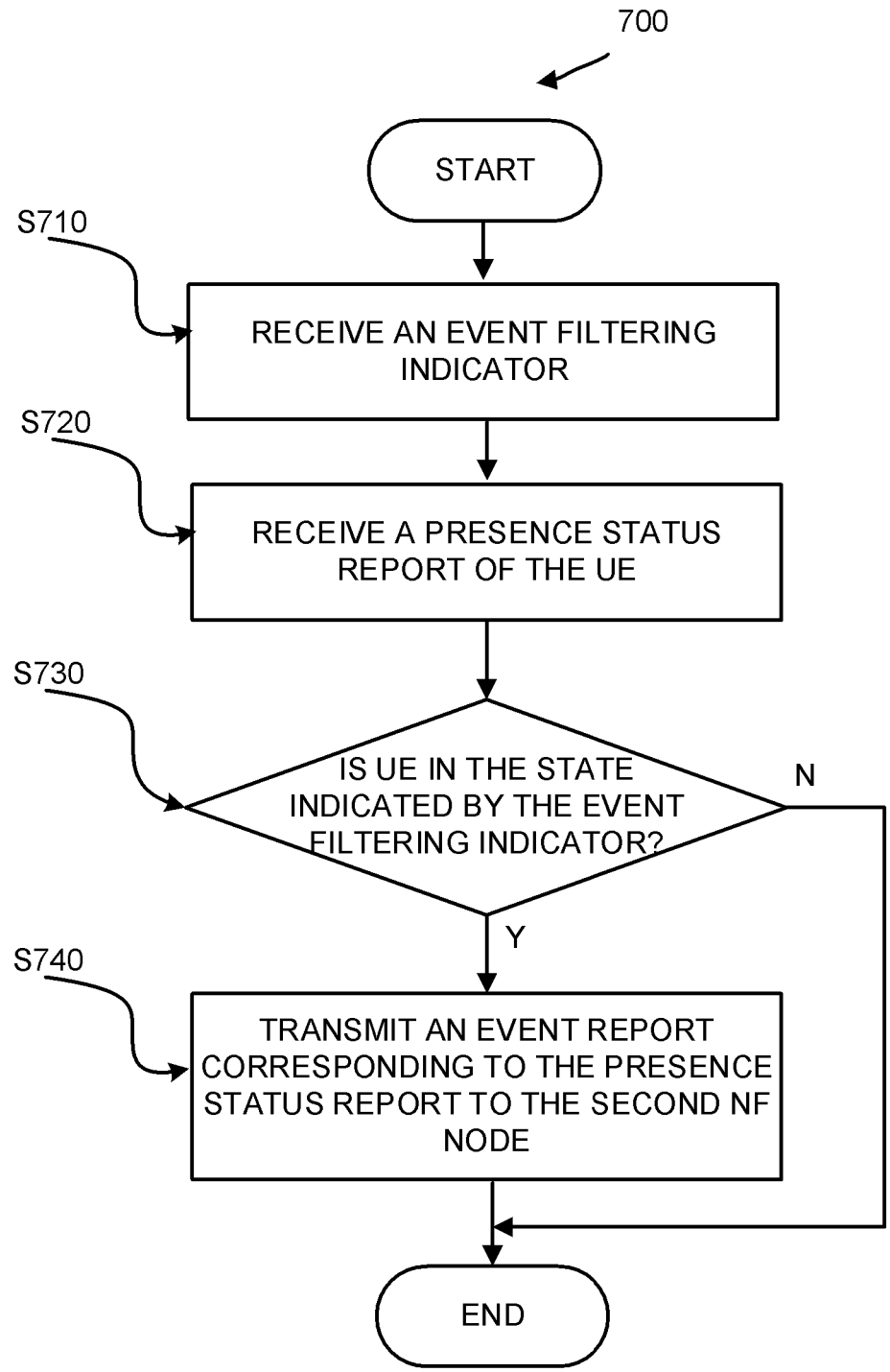
FIG. 7 illustratively shows a flowchart of a method 700 for managing an event report according to an exemplary embodiment of the present disclosure.

FIG. 7 illustratively shows a flowchart of a method 700 for managing an event report according to an exemplary embodiment of the present disclosure. In an embodiment, the method 700 may be performed at a first Network Function (NF) node for providing an event report for an event exposure service for a UE to a second NF node. The first NF node may be, for example, an AMF node or a SMF node. The second NF node may be, for example, a PCF node or a CHF node.

As shown in FIG. 7, the method 700 may include steps S710~S740.

The method starts in step S710, where the first NF node receives from the second NF node an event filtering indicator indicating a presence state of the UE which triggers an event report to the second NF node.

If a presence status report of the UE is received in step S720, the method proceeds to step S730 to match a presence state of the UE indicated by the presence status report with the presence state of the UE indicated by the event filtering indicator, to determine whether the UE is in the presence state indicated by the event filtering indicator.

If the UE is in the presence state indicated by the event filtering indicator, that is, the UE is in a presence state which triggers an event report, the method proceeds to step S740 to transmit an event report corresponding to the presence status report to the second NF. If the UE is not in the presence state indicated by the event filtering indicator, no event report will be transmitted for the received presence status report of the UE.

In an exemplary embodiment of the present disclosure, the event filtering indicator is an event filtering list listing more than one presence state of the UE which triggers an event report to the second NF node.

In an exemplary embodiment of the present disclosure, the presence status report indicates a presence state of the UE in a Presence Reporting Area, PRA, and the presence state of the UE comprises one or more of the following:
the UE is inside or enters the PRA;
the UE is outside or leaves the PRA;
it is unknown whether the UE is in the PRA or not; or
the PRA is inactive in the third NF node.

According to the embodiment, by providing an event filtering indicator, the second NF node may indicate the UE presence state(s) it wants to be notified about, and the first NF node will only report the UE present state event when the UE is in the present state indicated by the event filtering indicator.

Figure 8:
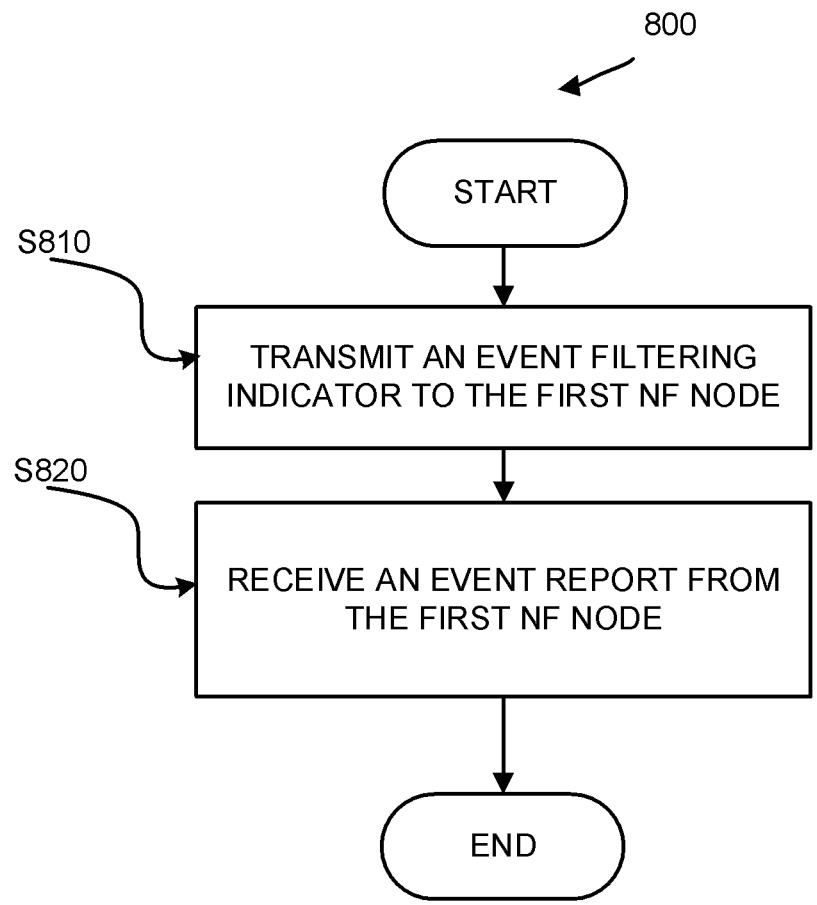
FIG. 8 illustratively shows a flowchart of a method 800 for managing an event report for an event exposure service according to an exemplary embodiment of the present disclosure.

FIG. 8 illustratively shows a flowchart of a method 800 for managing an event report for an event exposure service according to an exemplary embodiment of the present disclosure. In an embodiment, the method 800 may be performed at a second NF node. The second NF node may be, for example, an AMF node or a SMF node. The even report is provided from a first NF node which provides the event exposure service. The second NF node may be, for example, a PCF node or a CHF node.

As shown in FIG. 8, the method 800 may include steps S810~S820.

The method starts in step S810, where the second NF node transmits to the first NF node an event filtering indicator indicating a presence state of the UE which triggers the event report to the second NF node.

In an exemplary embodiment of the present disclosure, the event filtering indicator is an event filtering list listing more than one presence state of the UE which trigger an event report to the second NF node.

In an exemplary embodiment of the present disclosure, the presence state of the UE is a presence state of the UE in a Presence Reporting Area, PRA, and the presence state of the UE comprises one or more of the following:
the UE is inside or enters the PRA;
the UE is outside or leaves the PRA;
it is unknown whether the UE is in the PRA or not; or
the PRA is inactive in the third NF node.

The method may further comprise a step S820 of receiving an event report from the first NF node. The event report indicates that the UE is in the presence state indicated by the event filtering indicator.

According to the embodiment, by providing an event filtering indicator, the second NF node may indicate the UE presence state(s) it wants to be notified about, and the first NF node will only report the UE present state event when the UE is in the present state indicated by the event filtering indicator.

Hereafter, some embodiments of the present disclosure are described by taking some particular scenarios as examples. The particular scenarios are provided for illustrative purpose only and not any limiting.

Figure 9:
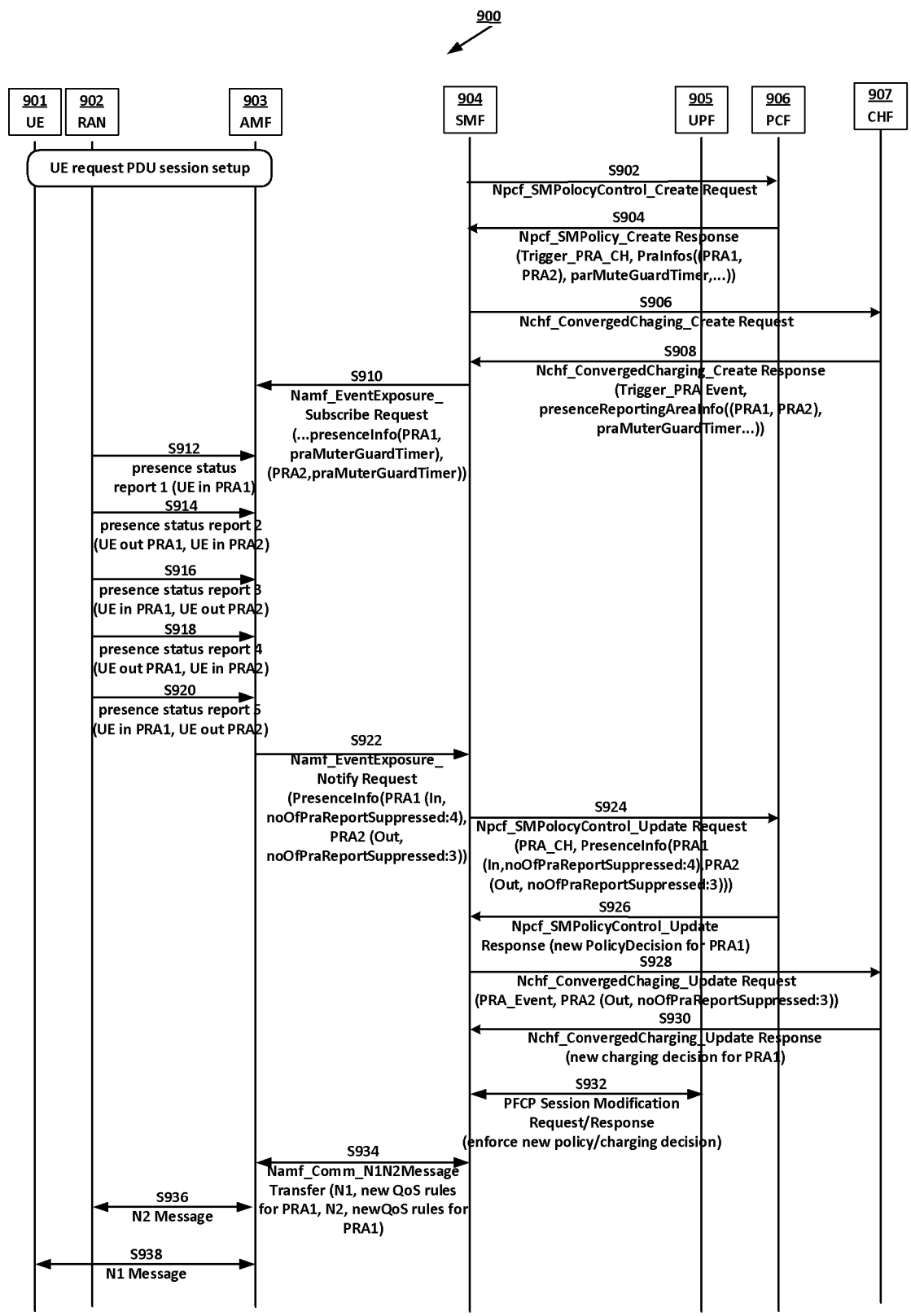
FIG. 9 shows an exemplifying signaling diagram illustrating a scenario 900 where PCR and/or CHF provisions one PRA report mute guard timer to be applied to all subscribed PRAs.

FIG. 9 shows an exemplifying signaling diagram illustrating a scenario 900 where PCR and/or CHF provisions one PRA report mute guard timer to be applied to all subscribed PRAs.

As shown in FIG. 9, it starts when UE 901 transmits a PDU session setup request to AMF 903.

In steps S902 and S904, PCF 906 has provisioned PRA information and optionally a PRA report mute guard timer at a PDU Session Setup procedure in SMPolicyDecision from PCF 906.

In steps S906 and S908, CHF 907 has provisioned PRA information and optional a PRA report mute guard timer at a PDU Session setup procedure in PDUSessionChargingInforamtion Of ChargingDataresponse from CHF 907.

In the embodiment, both PCF 906 and CHF 907 provision a PRA report mute guard timer. Alternatively, there may be some cases where only one of PCF 906 and CHF 907 provisions a PRA report mute guard timer. Steps S904 and S908 are examples of step S610 in FIG. 6.

In step S910, SMF 904 includes the PRA report mute guard timer for all subscribed PRAs at EventExposure subscription Create to AMF 903. The more restrictive PRA report mute guard timer is used by default for the same PRA ID if PCF 906 and CHF 907 provision different PRA report mute guard timers unless an operator defines the priority on SMF 904. That is, the value of the report mute guard timer used for the event report is the smallest one of the timers.

In step S912, AMF 903 receives UE presence status report 1 from RAN 902 for the subscribed PRAs, i.e., PRA1 and PRA2, and AMF 903 starts the PRA report mute guard timer without transmission of a PRA report corresponding to presence status report 1, and also suppresses subsequent PRA reports corresponding to presence status report 2, presence status report 3, presence status report 4, and presence status report 5 received in step S914~S920 while the PRA report mute guard timer is running. Step S912 is an example of steps S510 and S520 in FIG. 5A and FIG. 5B.

In step S922, the PRA report mute guard timer times out, and AMF 903 reports a PRA report corresponding to the last received presence status report 5 to SMF 904 using EventExposure Notify, including the noOfPraReportSuppressed for the subscribed PRA1 and PRA2.

In step S924, SMF 903 forwards the PRA report to PCF 906. PCF 906 provisions a new policy decision based on the UE presence state in PRA1 and PRA2 in step S926. Step S924 is an example of step S550 in FIG. 5A, step S550' in FIG. 5B, and step S620 in FIG. 6.

In step S928, SMF 903 forwards the PRA report to CHF 907, and CHF 907 provisions a new charging decision based on the UE status in PRA1 and PRA2 in step S930. Step S928 is also an example of step S550 in FIG. 5A, step S550' in FIG. 5B, and step S620 in FIG. 6.

In step S932, SMF 903 enforces the new policy and/or charging decision to UPF 905, and SMF 903 enforces the new policy and/or charging decision to RAN 902 and UE 901 in steps S934~S938.

In the embodiment, it shows the sequence for PCF and/or CHF provisioning PRA report mute guard timer at a PDU session setup procedure. Steps S904 and S908 can be Npcf or Nch Udpate Response, and Npcf_UpdateNotify Request all well.

According to the embodiment, it allows PCF and/or CHF centrally provisions the PRA report mute guard timer. This provides synchronized and aligned solution across the whole network to avoid misconfiguration. The PRA report mute guard timer can be tuned in the commercial network to get an optimized value per business case. It has at least the following benefits:

Do not need to have local configuration on each NF node, less operation and maintenance cost is required for the operator;

Less risk for miss configuration on different NFs caused unsynchronized network behavior;

Reduce signaling over the network in a short period due to too frequent PRA reports for un-stabilized UE presence status in PRAs;

Reduce risk of service interruption due to signaling interfering and conflicting procedures caused by too frequent PRA report and policy and charging decision enforcement per PRA while UE's presence state in PRA not stabilized yet;

Enables the PCF and/or CHF take the appropriate PRA based policy and charging decisions in circumstances of multiple crossings of PRA borders.

Figure 10:
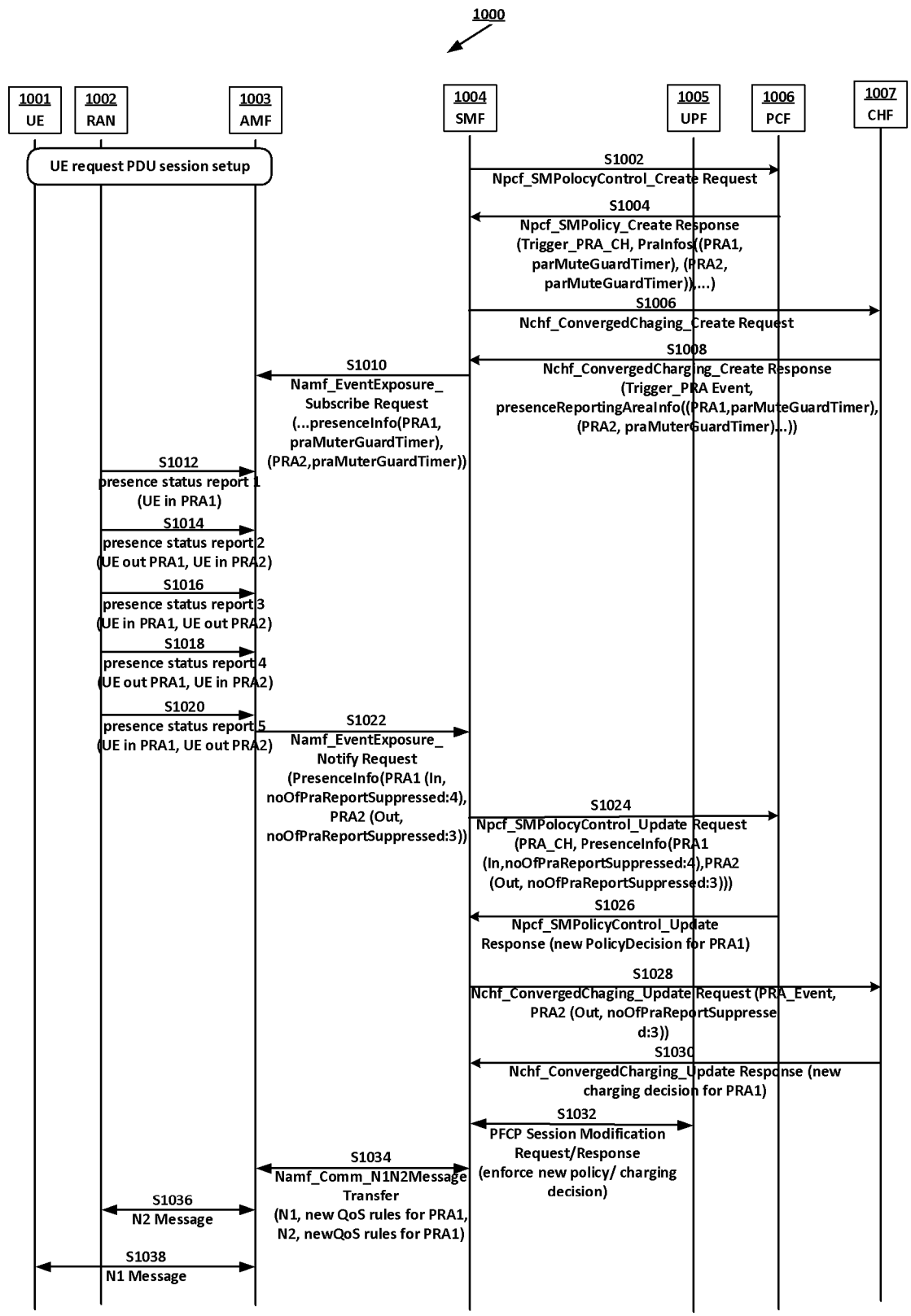
FIG. 10 shows an exemplifying signaling diagram illustrating a scenario 1000 where PCR and/or CHF provisions each PRA with one PRA report mute guard timer.

FIG. 10 shows an exemplifying signaling diagram illustrating a scenario 1000 where PCR and/or CHF provisions each PRA with one PRA report mute guard timer.

As shown in FIG. 10, it starts when UE 1001 transmits a PDU session setup request to AMF 1003.

In steps S1002 and S1004, PCF 1006 has provisioned PRA information and optionally a PRA report mute guard timer of each PRA at a PDU Session Setup procedure in SMPolicyDecision from PCF 1006.

In steps S1006 and S1008, CHF 1007 has provisioned PRA information and optional a PRA report mute guard timer of each PRA at a PDU Session setup procedure in PDUSessionChargingInforamtion Of ChargingDataresponse from CHF 1007.

In the embodiment, both PCF 1006 and CHF 1007 provision a PRA report mute guard timer for each PRA. Alternatively, there may be some cases where only one of PCF 1006 and CHF 1007 provisions a PRA report mute guard timer. Steps S1004 and S1008 are examples of step S610 in FIG. 6.

In step S1010, SMF 1004 includes the PRA report mute guard timers for respective subscribed PRAs at EventExposure subscription Create to AMF 1003. The more restrictive PRA report mute guard timer is used by default for the same PRA ID if PCF and CHF provision different PRA report mute guard timers unless an operator defines the priority on SMF 1004. As an example, the timer having the smallest value may be used. As another example, the PRA report mute guard timer from PCF may have a higher priority over CHF's PRA report mute guard timer for the same PRA ID.

In step S1012, AMF 1003 receives UE presence status report 1 from RAN 1002 for the subscribed PRAs, i.e., PRA1 and PRA2, and AMF 1003 starts the PRA report mute guard timer without transmission of a PRA report corresponding to presence status report 1, and also suppresses subsequent PRA reports corresponding to the presence status report 2, presence status report 3, presence status report 4, and presence status report 5 received in step S1014~S1020 while the PRA report mute guard timer is running. Step S1012 is an example of steps S510 and S520 in FIG. 5A and FIG. 5B. To simplify the illustration, it is shown that the PRA report mute guard timers for adjacent PRA1 and PRA2 have the same value. Certainly, the PRA report mute guard timers for adjacent PRA1 and PRA2 may have different values.

In step S1022, the PRA report mute guard timer times out, and AMF 1003 reports a PRA report corresponding to the last received PRA report 5 to SMF 1004 using EventExposure Notify, including the noOfPraReportSuppressed for the subscribed PRA1 and PRA2.

In step S1024, SMF 1003 forwards the PRA report to PCF 1006, and PCF 1006 provisions a new policy decision based on the UE status in PRA1 and PRA2 in step S1026. Step S1024 is an example of step S550 in FIG. 5A, step S550' in FIG. 5B, and step S620 in FIG. 6.

In step S1028, SMF 1003 forwards the PRA report to CHF 1007, and CHF 1007 provisions a new charging decision based on the UE status in PRA1 and PRA2 in step S1030. Step S1028 is also an example of step S550 in FIG. 5A, step S550' in FIG. 5B, and step S620 in FIG. 6.

In step S1032, SMF 1003 enforces the new policy and/or charging decision to UPF 1005, and SMF 1003 enforces the new policy and/or charging decision to RAN 1002 and UE 1001 in steps S1034~S1038.

In the embodiment, it shows the sequence for PCF and/or CHF provisioning PRA report mute guard timer at a PDU session setup procedure. Steps S1004 and S1008 can be Npcf or Nch Udpate Response, and Npcf_UpdateNotify Request all well.

Figure 11:
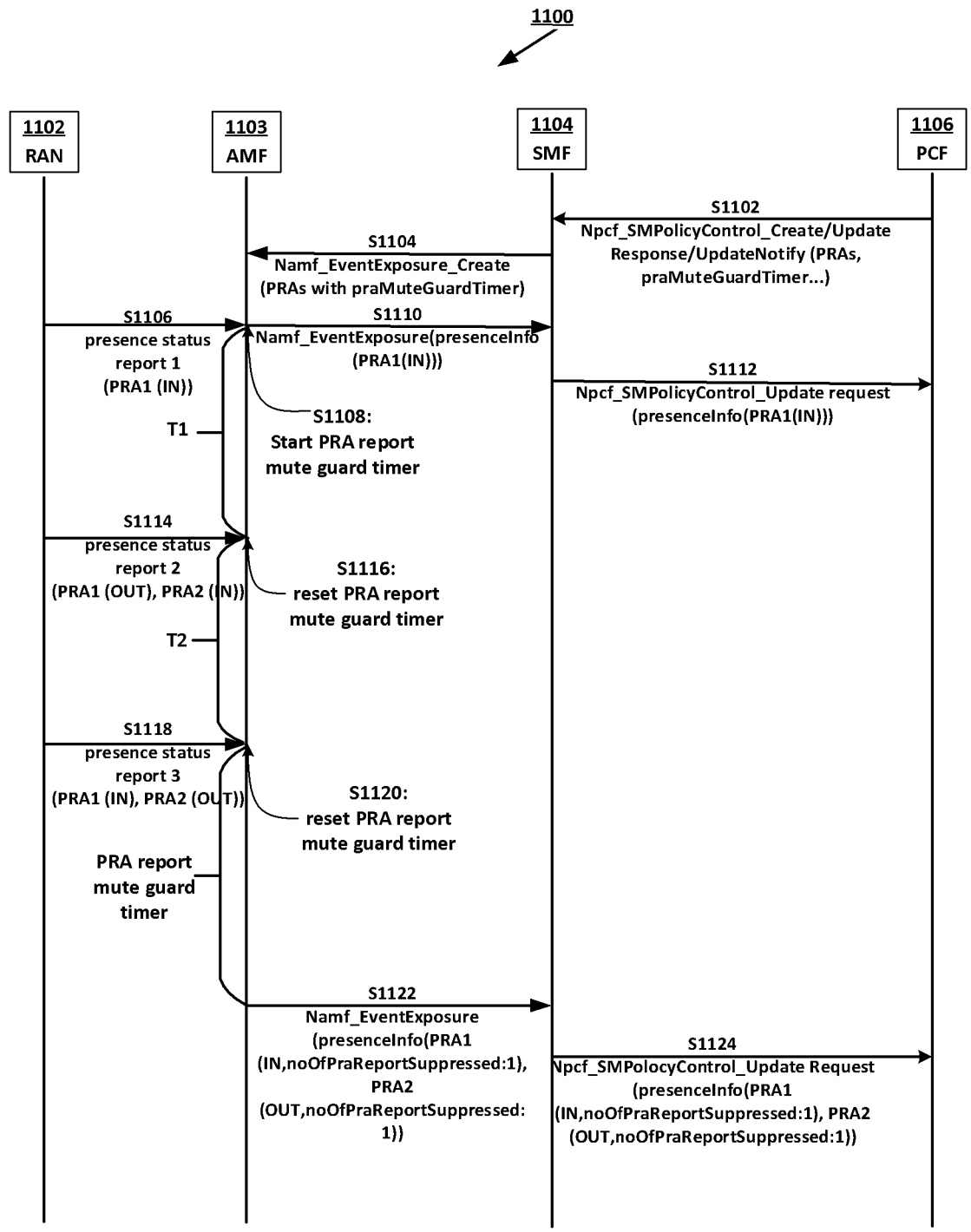
FIG. 11 shows an exemplifying signaling diagram illustrating a scenario 1100 where the PRA report mute guard timer is used in a way different from that shown in FIGS. 9 and 10.

FIG. 11 shows an exemplifying signaling diagram illustrating a scenario 1100 where the PRA report mute guard timer is used in a way different from that shown in FIGS. 9 and 10.

In step S1102, PCF 1106 provisions the subscribed PRAs with one PRA report mute guard timer in SMPolicyDecision or provisions respective PRA report mute guard timers for each PRA. Step S1102 is an example of step S610 in FIG. 6.

In step S1104, SMF 1104 creates a PRA subscription with the PRA report mute guard timer for each subscribed PRA, i.e., PRA1 and PRA2 in the example.

In step S1106, RAN 1102 reports a first presence status report 1, i.e., UE in PRA1 (PRA1(IN)) to AMF 1103. In response to receiving the presence status report 1, AMF 1103 starts the PRA report mute guard timer in step S1108, and transmits a PRA report 1 (PRA1(IN)) to SMF 1104 in step S1110. Step S1106 is an example of step S5510 in FIG. 5B. Step S1108 is an example of step S520 in FIG. 5B.

In step S1112, SMF 1104 forwards the received PRA report 1 to PCF 1106. Step S1112 is an example of step S520' in FIG. 5B.

At T1 (T1<PRA report mute guard timer) from step S1106, RAN 1103 reports a second presence status report 2, i.e., UE in PRA2 (PRA1(OUT), PRA2(IN)) to AMF 1103 in step S1114. Step S1114 is an example of step S530 in FIG. 5B.

In response to receiving the presence status report 2, AMF 1103 resets the PRA report mute guard timer and suppresses a PRA report in step S1116. Step S1116 is an example of step S540' in FIG. 5B.

At T2 (T2<PRA report mute guard timer) from step S1114, RAN 1103 reports a third presence status report 3, i.e., UE in PRA1 (PRA1(IN), PRA2(OUT)) to AMF 1103 in step S1118. In response to receiving the presence status report 3, AMF 1103 resets the PRA report mute guard timer and suppresses a PRA report in step S1120. Step S1118 is an example of step S530 in FIG. 5A and FIG. 5B. Step S1120 is an example of step S540' in FIG. 5B.

When the PRA report mute guard timer times out, AMF 1103 compares the last received presence status report (the presence status report 3) with the first presence status report (the presence status report1). If the presence status report 3 and the presence status report 1 indicate different presence sates of the UE, AMF 1103 transmits a PRA report to SMF 1104 in step S1122 and also includes a number of suppressed reports in the PRA report. SMF 1104 then forwards the PRA report to PCF 1106 in step S1124. PCF 1106 may provision a new policy decision based on the UE's presence state in PRA1 and PRA2 as indicated in the PRA report. Step S1124 is an example of step S550' in FIG. 5B and step S620 of FIG. 6.

According to the embodiment, PCT 1106 knows the number of suppressed PRA reports from the received PRA report, and can know whether the UE is moving around the border of multiple PRAs, so it can make the policy decision to be applied based on the learned information. It also applies to the CHF, which can make the charging decision based on the information included in the PAR report.

Figure 12:
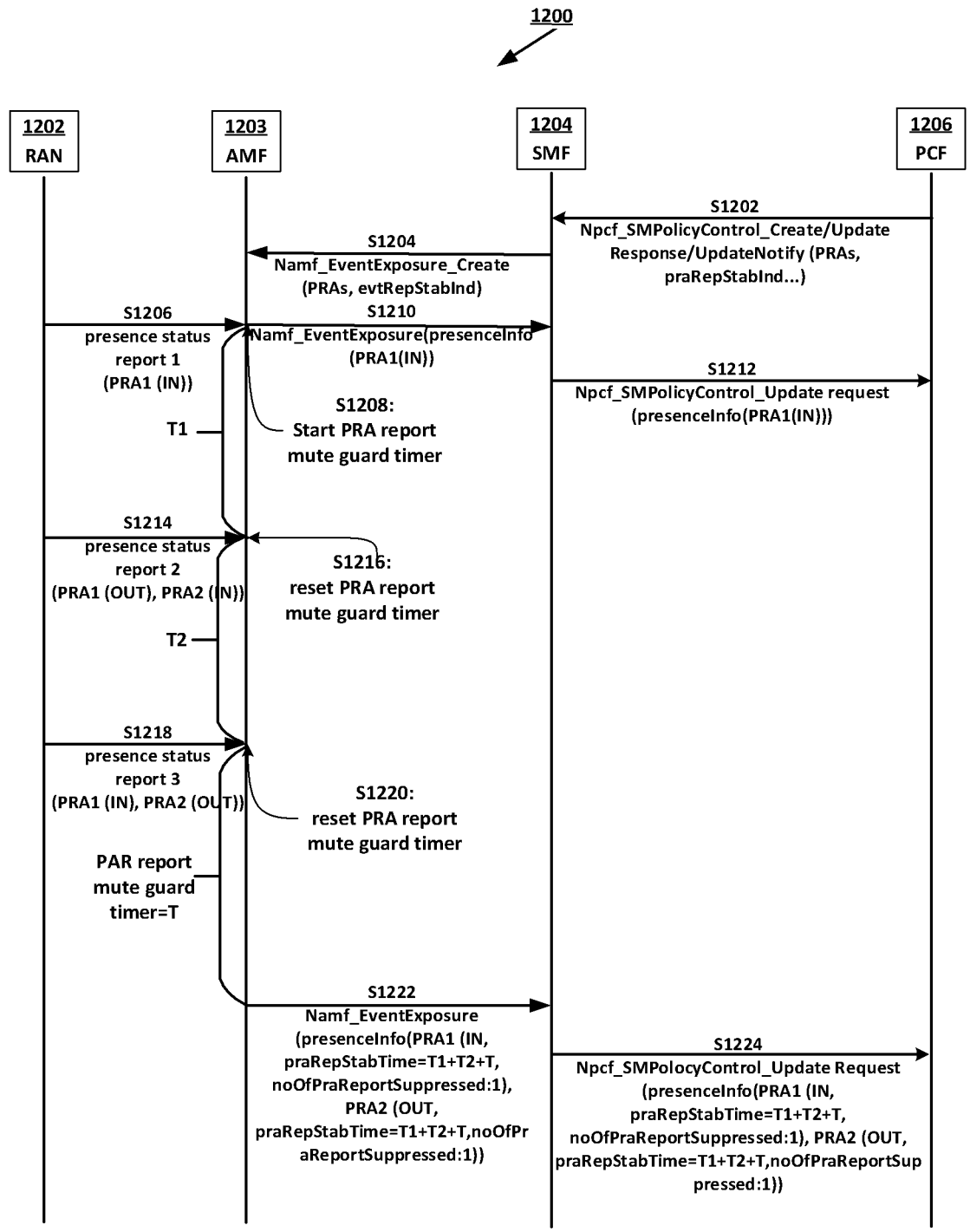
FIG. 12 shows an exemplifying signaling diagram illustrating a scenario 1200 where AMF locally configures a PRA report mute guard timer and receives from PCF a PRA report stable indication which is set to true.

FIG. 12 shows an exemplifying signaling diagram illustrating a scenario 1200 where AMF locally configures a PRA report mute guard timer and receives from PCF a PRA report stable indication which is set to true.

FIG. 12 shows a scenario where the PCF provisions a PRA report mute guard timer. It applies to the scenario where CHF provisions the PRA report mute guard timer as well.

For interworking with legacy NFs which do not provision PRA Report Mute Guard timer, the AMF local configured PRA report mute guard timer can still be used.

In step S1202, PCF 1206 provisions PRA information, including praRepStabInd set to true, to indicate that the event report shall be performed when a presence state for the UE is stabilized. Step S1204 is an example of step S610 of FIG. 6.

In step S1204, SMF 1204 creates a PRA subscription to AMF 1203 with evtRepStabInd for UE's presence state in PRA, to indicate that the event report shall be performed when a presence state for the UE is stabilized.

In step S1206, RAN 1202 reports a first presence status report 1, i.e., UE in PRA1 (PRA1(IN)) to AMF 1203. In response to receiving the presence status report 1, AMF 1203 starts a locally configured PRA report mute guard timer ("T") in step S1208, and transmits a PRA report 1 (PRA1(IN)) to SMF 1204 in step S1210. Step S1206 is an example of step S510 in FIG. 5B. Step S1208 is an example of steps S520 of FIG. 5B.

In step S1212, SMF 1204 forwards the received PRA report 1 to PCF 1206. Step S1212 is an example of S520' of FIG. 5B and step S620 of FIG. 6.

At T1 (T1<PRA report mute guard timer) from step S1206, RAN 1203 reports a second presence status report 2, i.e., UE in PRA2 (PRA1(OUT), PRA2(IN)) to AMF 1203 in step S1214. In response to receiving the presence status report 2, AMF 1203 resets the locally configured PRA report mute guard timer and suppresses a PRA report 2 corresponding to the presence status report 2 in step S1216. AMF 1203 accumulates the stable period with T1. Step S1214 is an example of step S530 of FIG. 5B. Step S1216 is an example of S540' of FIG. 5B.

At T2 (T2<PRA report mute guard timer) from step S1214, RAN 1203 reports a third presence status report 3, i.e., UE in PRA1 (PRA1(IN), PRA2(OUT)) to AMF 1203 in step S1218. In response to receiving the presence status report 3, AMF 1203 resets the locally configured PRA report mute guard timer and suppresses a PRA report 3 corresponding to the presence status report 3 in step S1220. AMF 1203 accumulates the stable period with T1+T2. Step S1218 is an example of step S530 of FIG. 5B. Step S1220 is an example of step S540' of FIG. 5B.

When the locally configured PRA report mute guard timer times out, AMF 1203 compares the last received presence status report (the presence status report 3) with the first presence status report (the presence status report 1). If the presence status report 1 and the presence status report 3 indicate different present states of the UE, AMF 1203 transmits the PRA report 3 to SMF 1204 in step S1222 and also includes a number of suppressed reports and a stable period=T1+T2+T in the PRA report 3. SMF 1204 then forwards the PRA report 3 to PCF 1206 in step S1224. PCF 1206 may provision a new policy decision based on the UE status in PRA1 and PRA2 as indicated in the PRA report 3. Step S1224 is an example of step S550' of FIG. 5B and step S620 of FIG. 6.

According to the embodiment, the PCF/CHF indicates that PRA report shall be performed when UE status in PRAs is stabilized by optionally including an indication with PRA provision. With this indication, the serving Node (AMF/MME/SMF) has option to report UE status in PRA stable time using locally configured timer. It has at least the following benefits:

Flexibility using local configured stable timer on SMF/MME/SMF in case PCF/CHF does not support provision of PRA Mute Guard timer or operator choose using local timer.

PRA report is only performed when UE status in PRAs is stabilized, therefore reduce network signaling over a period and reduce interfering and conflicting procedure due to too frequent PRA report.

Provide a solution that servers (PCF/CHF) is aware of UE status in PRA stabilized period and number of suppressed PRA report.

Enables operator awareness of unstable UE status in PRA at crossings of PRA borders better for network tuning and planning.

When the concept is applied to network statistics and analytics function, it enables operator awareness of the unstable events in certain part of the network for better network tuning and planning.

Figure 13:
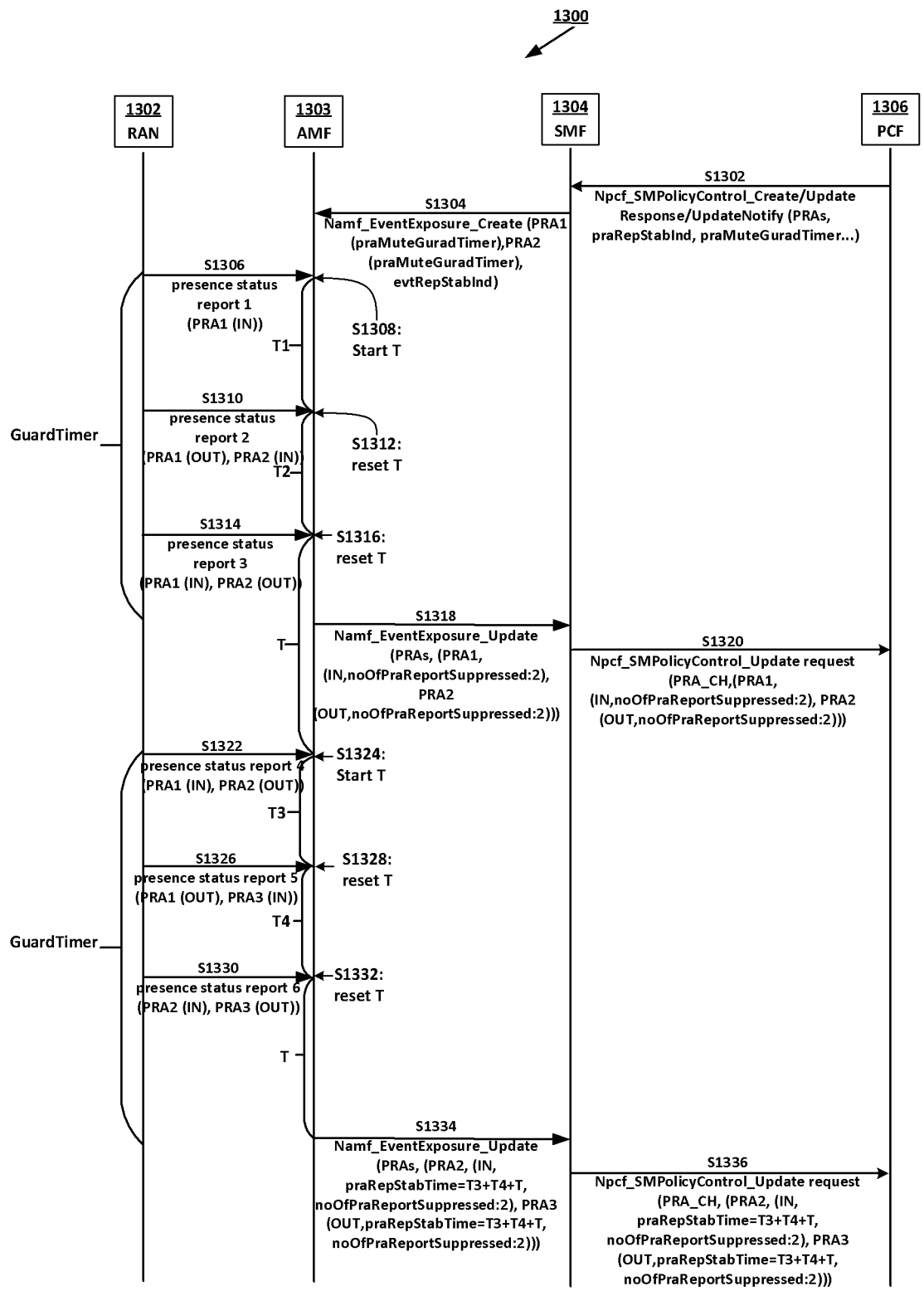
FIG. 13 illustrates a scenario 1300 where an AMF locally configured PRA report mute guard timer interworks with PCF provisioned PRA Report Mute Guard timer.

FIG. 13 illustrates a scenario 1300 where an AMF locally configured PRA report mute guard timer interworks with PCF provisioned PRA Report Mute Guard timer. It is also applicable to a scenario where an AMF locally configured PRA report mute guard timer interworks with CHF provisioned PRA Report Mute Guard timer.

In step S1302, PCF 1306 provisions PRA information, including praRepStabInd set to true, to indicate that the event report shall be performed when a presence state for the UE is stabilized. PCF 1306 also provisions a PRA Report Mute Guard Timer. Step S1302 is an example of step 610 of FIG. 6.

In step S1304, SMF 1304 creates a PRA subscription to AMF 1303, with evtRepStabInd for UE presence state in PRAs, to indicate that the PRA report shall be performed when a presence state for the UE is stabilized. SMF 1304 also includes praMuteGuardTimer for each subscribed PRA in the PRA subscription.

In step S1306, RAN 1302 reports a first presence status report 1, i.e., UE in PRA1 (PRA1(IN)) to AMF 1303. In response to receiving the presence status report 1, AMF 1303 starts a locally configured PRA report mute guard timer ("T"), starts the PRA Report Mute Guard Timer provisioned by PCF 1306, and suppresses a PRA report 1 corresponding to the presence status report 1 in step S1308. Step S1306 is an example of step S510 of FIGS. 5A and 5B. Step S1308 is an example of S520 of FIGS. 5A and 5B.

At T1 (T1<T) from step S1306, RAN 1303 reports a second presence status report 2, i.e., UE in PRA2 (PRA1(OUT), PRA2(IN)) to AMF 1303 in step S1310. In response to receiving the presence status report 2, AMF 1303 resets the locally configured PRA report mute guard timer and suppresses a PRA report 2 corresponding to the presence status report 2 in step S1312. AMF 1303 accumulates the stable period with T1. Step S1310 is an example of step S530 of FIGS. 5A and 5B. Step S1312 is an example of S540' of FIG. 5B.

At T2 (T2<T) from step S1306, RAN 1303 reports a third presence status report 3, i.e., UE in PRA1 (PRA1(IN), PRA2(OUT)) to AMF 1303 in step S1314. In response to receiving the presence status report 3, AMF 1303 resets the locally configured PRA report mute guard timer and suppresses a PRA report 3 corresponding to the presence status report 3 in step S1316. AMF 1303 accumulates the stable period with T1+T2. Step S1314 is an example of step S530 of FIGS. 5A and 5B. Step S1316 is an example of S540' of FIG. 5B.

When the PRA Report Mute Guard Timer provisioned by PCF 1306 times out, AMF 1303 reports the PRA report corresponding to the last received presence status report while the PRA Report Mute Guard Timer is running, which is PRA Report 3 (PRA1(IN), PRA2(OUT)), to SMF 1304 and noOfPraReportSuppressed=2 for each PRA in step S1318.

SMF 1304 then forwards the received PRA report 3 to PCF 1306 in step S1320. PCF 1306 may provision a new policy decision based on UE presence state in PRA1. Step S1320 is an example of step S550' of FIG. 5B and step S620 of FIG. 6.

When the locally configured report mute guard timer T times out, there is no change of UE presence state in PRA, therefore AMF 1304 does not trigger any PRA report.

After a while, RAN 1302 reports a fourth presence status report 4, i.e., UE in PRA1 (PRA1(OUT), PRA2(IN)) in step S1322. In response to receiving the presence status report 4, AMF 1303 starts a locally configured PRA report mute guard timer ("T"), starts the PRA Report Mute Guard Timer provisioned by PCF 1306, and suppresses a PRA report 4 corresponding to the presence status report 4 in step S1324. Step S1322 is an example of step S510 of FIGS. 5A and 5B. Step S1324 is an example of S520 of FIGS. 5A and 5B.

At T3 (T3<T) from step S1322, RAN 1303 reports a fifth presence status report 5, i.e., UE in PRA3 (PRA2(OUT), PRA3(IN)) to AMF 1303 in step S1326. In response to receiving the presence status report 5, AMF 1303 resets the locally configured PRA report mute guard timer and suppresses a PRA report 5 corresponding to the presence status report 5 in step S1328. AMF 1303 accumulates the stable period with T3. Step S1326 is an example of step S530 of FIGS. 5A and 5B. Step S1328 is an example of S540' of FIG. 5B.

At T4 (T4<T) from step S1326, RAN 1303 reports a sixth presence status report 6, i.e., UE in PRA2 (PRA2(IN), PRA3(OUT)) to AMF 1303 in step S1330. In response to receiving the presence status report 6, AMF 1303 resets the locally configured PRA report mute guard timer and suppress a PRA report 6 corresponding to the presence status report 6 in step S1332. AMF 1303 accumulates the stable period with T3+T4. Step S1330 is an example of step S530 of FIGS. 5A and 5B. Step S1332 is an example of S540' of FIG. 5B.

When the locally configured report mute guard timer T times out, as the PRA Report Mute Guard Timer provisioned by PCF is still running, AMF 1303 stops the locally configured report mute guard timer T and accumulates the stable period as T3+T4+T. AMF 1303 does not trigger any PRA report to SMF 1304.

When the PRA Report Mute Guard Timer provisioned by PCF times out, AMF 1303 reports the PRA report corresponding to the last received presence status report while the PRA Report Mute Guard Timer is running, which is PRA report 6 (PRA2(IN), PRA3(OUT)), to SMF 1304 and noOfPraReportSuppressed=2 for each PRA, and praReportStabTime=T3+T4+T in step S1334.

SMF 1304 then forwards the received PRA report 6 to PCF 1306 in step S1336. PCF 1306 may provision a new policy decision based on UE's presence state in PRA2. Step S1336 is an example of step S550' of FIG. 5B and step S620 of FIG. 6.

In the real application, if a locally configured report mute guard timer and a PCF/CHF provisioned report mute guard timer co-exist, which timer take precedence is based on an operator policy if configured in AMF or SMF. If no specific policy configured, PCF and/or CHF provisioned timer takes precedence.

According to the present disclosure, the SmPolicyDecision information element in the 3GPP specification may be modified as below.

3GPP TS29.512, 5.6.2.4 Type SmPolicyDecision

TABLE 5.6.2.4-1

Definition of type SmPolicyDecision

| Attribute name | Data type | P | Cardinality | Description | Applicability |
|---|---|---|---|---|---|
| . . . | | | | | |
| praMuteGuardTimer | DurationSec | O | 0 . . . 1 | Defines a period that PRA report shall be suppressed, applicable for provisioned PRAs of the UE. When it's provisioned, it applies to all subscribed PRAs | PraMute |

TABLE 5.6.2.4-1-continued

Definition of type SmPolicyDecision

| Attribute name | Data type | P | Cardinality | Description | Applicability |
|---|---|---|---|---|---|
| praRepStabInd | boolean | O | 0...1 | Indicates PRA report shall be performed when UE status in PRAs is stabilized based on local timer in serving node when it is included and set to 1. | PraMute |
| praFilters | PresenceStatusFilter | | 0...1 | Indicates the UE presence state(s) it wants to be notified about | PraMute |

The related part in 3GPP TS29.512 shall be modified as below.
3GPP TS29.512, 5.8 Feature Negotiation

TABLE 5.8-1

Supported Features

| Feature number | Feature Name | Description |
|---|---|---|
| x | PraMute | This feature indicates the support of PRA Mute feature. With PRA Mute Feature, it is optionally that a PRA Mute Timer, Indication of PRA Report when Stable, and No PRA Report for UNKNOWN status can be provisioned. |

According to the present disclosure, the PDUSession-ChargingInformation information element in the 3GPP specification may be modified as below.
3GPP TS32.291 6.1.6.2.2.6 Type PDUSessionChargingInformation

TABLE 6.1.6.2.2.6-1

Definition of type PDUSessionChargingInformation

| Attribute name | Data type | P | Cardinality | Description | Applicability |
|---|---|---|---|---|---|
| ... | | | | | |
| praMuteGuardTimer | DurationSec | O | 0...1 | Defines a period that PRA report shall be suppressed, applicable for provisioned PRAs of the UE. When it's provisioned, it applies to all subscribed PRAs | PraMute |
| praRepStabInd | boolean | O | 0...1 | Indicates PRA report shall be performed when UE status in PRAs is stabilized based on local timer in serving node when it is included and set to 1. | PraMute |
| praFilters | PresenceStatusFilter | O | 0...1 | Indicates the UE presence state(s) it wants to be notified about | PraMute |

The related part in 3GPP TS32.291 shall be modified as below.
3GPP32,291, 6.1.8 Feature Negotiation

TABLE 6.1.8-1

Supported Features

| Feature number | Feature Name | Description |
|---|---|---|
| x | PraMute | This feature indicates the support of PRA Mute feature. With PRA Mute Feature, it is optionally that a PRA Mute Timer, Indication of PRA Report when Stable, and No PRA Report for UNKNOWN status can be provisioned. |

According to the present disclosure, the PresenceInfo information element in the 3GPP specification may be modified as below.
3GPP TS29.571, 5.4.4.27 Type: PresenceInfo

TABLE 5.4.4.27-1

Definition of type PresenceInfo

| | | | | |
|---|---|---|---|---|
| ... | | | | |
| praMuteGuardTimer | DurationSec | O | 0...1 | Defines a timer that PRA report shall be suppressed while the timer is running. Timer starts when a report is received of the UE status report for the PRA. The PRA report and subsequent PRA reports of the UE status for the PRA shall be suppressed while the timer is |

TABLE 5.4.4.27-1-continued

Definition of type PresenceInfo

| | | | | |
|---|---|---|---|---|
| | | | | running. The last PRA report received of the UE status for the PRA while the timer is running shall be reported when the timer timeout. |
| noOfPraReportsSuppressed | Integer | O | 0 . . . 1 | Ddefine the number of times that the UE status report for presence in the PRA are suppressed during the PRA Mute Guard period |
| praRepStabTime | Integer | O | 0 . . . 1 | Define the accumulated time for PRA report is stabilized. |
| praFilters | PresenceStatusFilter | O | 0 . . . 1 | Indicates the UE presence state(s) it wants to be notified about |

Figure 14:
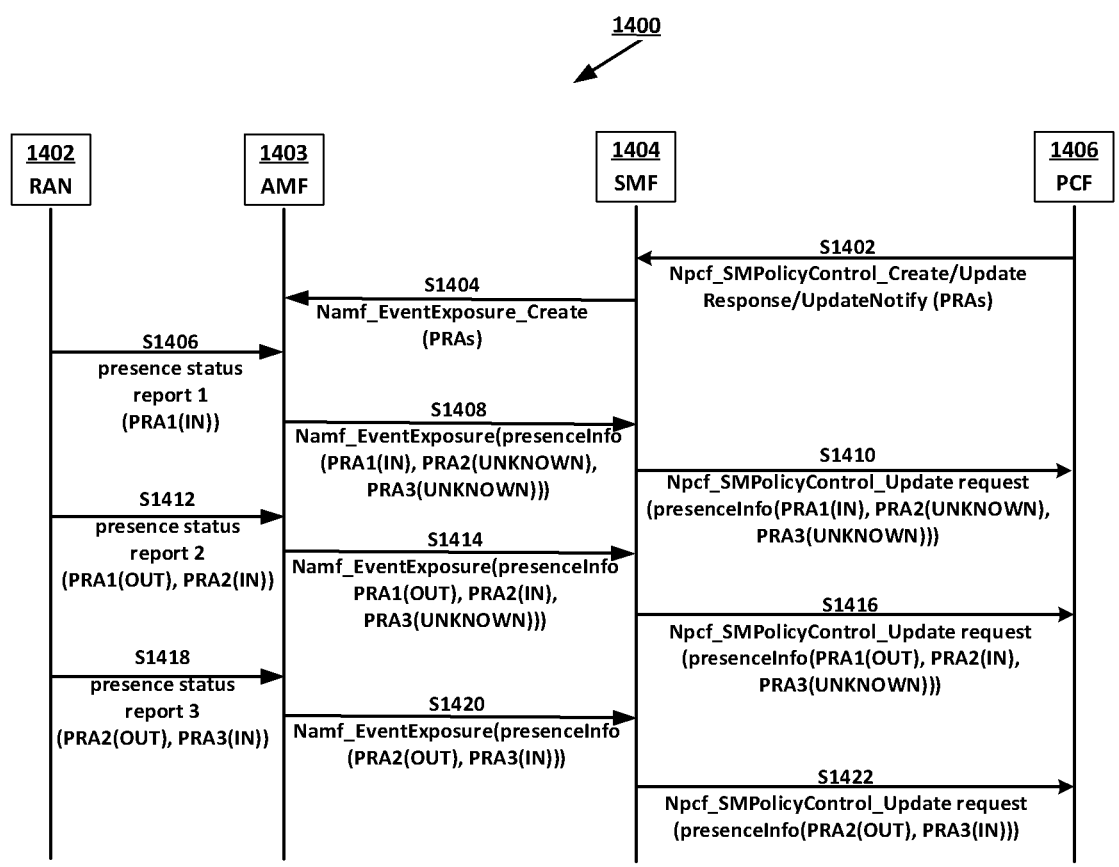
FIG. 14 illustrates a scenario 1400 where PCF is notified with UE status.

FIG. 14 illustrates a scenario 1400 where PCF is notified with UE's presence state.

In step S1402, PCF 1406 provisions PRA information to SMF 1404.

In step S1404, SMF 1404 creates a PRA subscription to AMF 1403.

In step S1406, RAN 1402 reports a first presence status report 1, i.e., UE in PRA1 (PRA1(IN)) to AMF 1403. In response to receiving the presence status report 1, AMF 1403 transmits a PRA report 1 corresponding to the presence status report 1 to SMF 1404, i.e., PRAs (PRA1(IN), PRA2 (UNKNOWN), PRA3(UNKNOWN)) in step S1408. SMF 1404 then forwards the PRA report 1 to PCF 1406, i.e., PRAs(PRA1(IN), PRA2(UNKNOWN), PRA3(UNKNOWN)) in step S1410.

In step S1412, RAN 1402 reports a second presence status report 2, i.e., UE in PRA 2 (PRA1(OUT), PRA2(IN)) to AMF 1403. In response to receiving the presence status report 2, AMF 1403 transmits a PRA report 2 corresponding to the presence status report 2 to SMF 1404, i.e., PRAs (PRA1(OUT), PRA2(IN), PRA3(UNKNOWN)) in step S1414. SMF 1404 then forwards the PRA report 2 to PCF 1406, i.e., PRAs(PRA1(OUT), PRA2(IN), PRA3(UNKNOWN)) in step S1416.

In step S1418, RAN 1402 reports a third presence status report 3, i.e., UE in PRA 3 (PRA2(OUT), PRA3(IN)) to AMF 1403. In response to receiving the presence status report 3, AMF 1403 transmits a PRA report 3 corresponding to the presence status report 3 to SMF 1404, i.e., PRAs (PRA2(OUT), PRA3(IN)) in step S1420. SMF 1404 then forwards the PRA report 3 to PCF 1406, i.e., PRAs(PRA2(OUT), PRA3(IN)) in step S1422.

Figure 15:
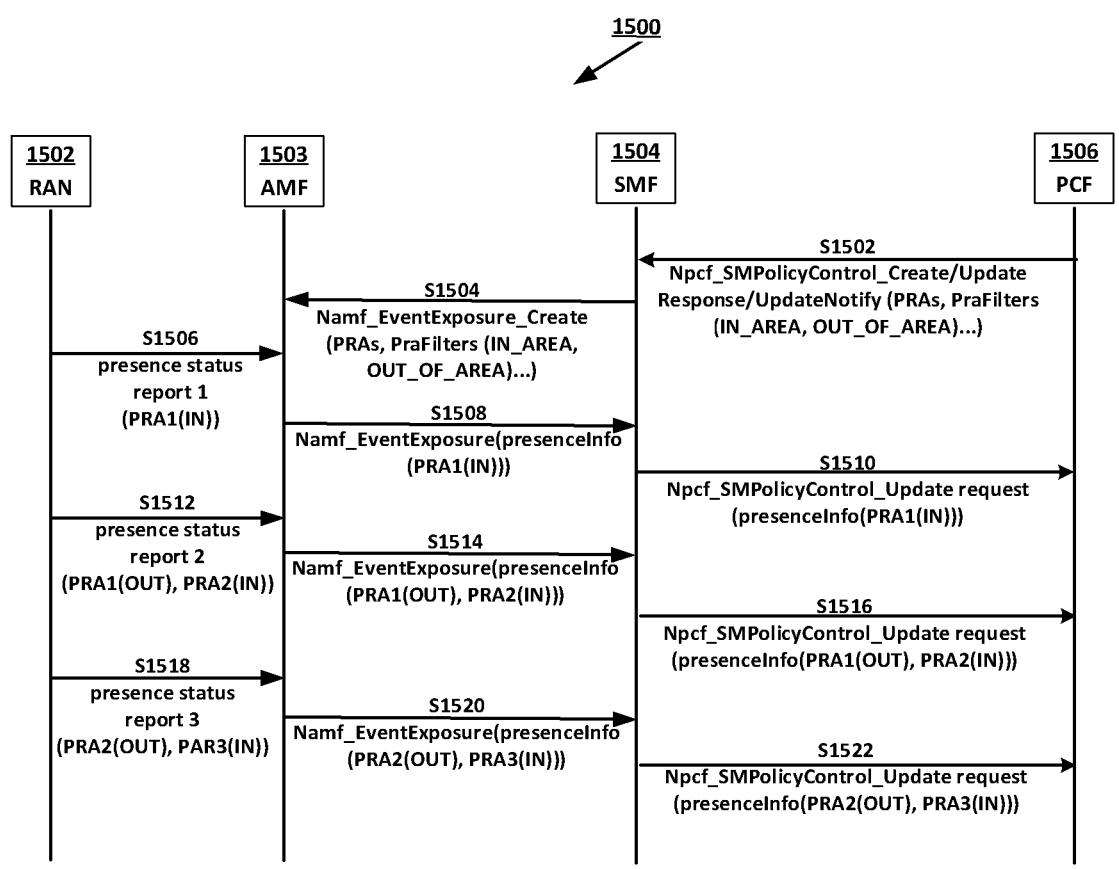
FIG. 15 illustrates a scenario 1500 where PCF provisions an event filtering indicator to indicate UE status the PFC wants to be notified.

FIG. 15 illustrates a scenario 1500 where PCF provisions an event filtering indicator PraFilters to indicate UE status the PFC wants to be notified. For example, the UE status may be IN_AREA, or OUT_OF_AREA. UE status UNKNOWN and INACTIVE shall not be notified.

In step S1502, PCF 1506 provisions PRA information with an event filtering indicator PraFilters. Step S1520 is an example of step S710 of FIG. 7 and step S810 of FIG. 8.

In step S1504, SMF 1504 creates a PRA subscription to AMF 1503.

In step S1506, RAN 1502 reports a first presence status report 1, i.e., UE in PRA1 (PRA1(IN)) to AMF 1503. In response to receiving the presence status report 1, AMF 1503 transmits a PRA report 1 corresponding to the presence status report 1 to SMF 1504, i.e., PRAs(PRA1(IN)) in step S1508. SMF 1504 then forwards the PRA report 1 to PCF 1506, i.e., PRAs(PRA1(IN)) in step S1510. Step S1506 is an example of step S720 of FIG. 7. Step S1510 is an example of step S740 of FIG. 7 and step S820 of FIG. 8.

In step S1512, RAN 1502 reports a second presence status report 2, i.e., UE in PRA2 (PRA1(OUT), PRA2(IN)) to AMF 1503. In response to receiving the presence status report 2, AMF 1503 transmits a PRA report 2 corresponding to the presence status report 1 to SMF 1504, i.e., PRAs (PRA1(OUT), PRA2(IN)) in step S1514. SMF 1504 then forwards the PRA report 2 to PCF 1506, i.e., PRAs(PRA1(OUT), PRA2(IN)) in step S1516. Step S1512 is an example of step S720 of FIG. 7. Step S1516 is an example of step S740 of FIG. 7 and step S820 of FIG. 8.

In step S1518, RAN 1502 reports a third presence status report 3, i.e., UE in PRA3 (PRA2(OUT), PRA3(IN)) to AMF 1503. In response to receiving the presence status report 3, AMF 1503 transmits a PRA report 3 corresponding to the presence status report 3 to SMF 1504, i.e., PRAs (PRA2(OUT), PRA3(IN)) in step S1520. SMF 1504 then forwards the PRA report 3 to PCF 1506, i.e., PRAs(PRA2(OUT), PRA3(IN)) in step S1522. Step S1518 is an example of step S740 of FIG. 7 and step S820 of FIG. 8. Step S1522 is an example of step S740 of FIG. 7 and step S820 of FIG. 8.

FIG. 15 shows that the UE status in PRA "UNKNWON" is suppressed by AMF in step S1514, S1516, S1520 and S1522, compared with the scenario where no such event filtering indication is provided as shown in FIG. 14.

According to the embodiment, the PCF and/or CHF can decide UE presence state(s) it wants to be notified about and indicates it to SMF or AMF. For example, UE status in PRA "IN/OUT" can be used by PCF and/or CHF for policy and charging decision making. UE status in PRA "UNKNOWN" does not give much value as "IN/OUT" for policy and charging decision making, so information on UE status in PRA "UNKNOWN" can be filtered out.

During the subscription to e.g. PRA changes the NF service consumer, e.g., PCF or CHF, may include the attribute "praFilters" of type array of PresenceStatusFilter to indicate the UE presence state(s) it wants to be notified about. This data type would be used, e.g., for PCF subscription to PRA changes for a PDU session as follows:

The PCF includes, within the SmPolicyDecision data type the new attribute, "praFilters" of data type array of PresenceStatusFilter to indicate the UE presence state(s) it wants to be notified about.

The SMF, when invoking the Namf_EventExposure_Subscribe service operation to subscribe to presence in area of interest, includes within the AmfEvent type, the received "praFilters".

When a change of UE presence in the received PRA(s) occurred, the AMF checks the matching PRA filters, and if matched, the AMF generates the corresponding report.

When the SMF receives the report, the SMF requests new policies to the PCF reporting PRA changes.

According to the present disclosure, the event filtering indicator PresenceStatusFilter information element may be added in 3GPP TS29.571 as below.

| Type: Enumeration | |
|---|---|
| Enumeration value | Description |
| "IN_AREA" | The presence state that indicates the UE is inside or enters the presence reporting area event is reported. |
| "OUT_OF_AREA" | The presence state that indicates that the UE is outside or leaves the presence reporting is reported |
| "UNKNOWN" | The presence state that indicates it is unknown whether the UE is in the presence reporting area or not is reported. |
| "INACTIVE" | The presence state that indicates that the presence reporting area is inactive in the serving node is reported. |

The related part in 3GPP TS29.518 is as below.
3GPP TS29.518, 6.2.6.2.16 Type: AmfEventArea

TABLE 6.2.6.2.16-1

| Definition of type AmfEventArea | | | | | |
|---|---|---|---|---|---|
| Attribute name | Data type | P | Cardinality | Description | Applicability |
| presenceInfo | PresenceInfo | O | 0 . . . 1 | This IE shall be present if the Area of Interest subscribed is not a LADN service area (e.g. Presence Reporting Area or a list of TAIs/cell Ids) | |
| . . . | | | | | |

According to the disclosure, the AmfEvent information element in the 3GPP specification may be modified as below.
3GPP TS29.518, 6.2.6.2.3, Type: AmfEvent

TABLE 6.2.6.2.3-1

| Definition of type AmfEvent | | | | |
|---|---|---|---|---|
| Attribute name | Data type | P | Cardinality | Description |
| . . . | . . . | | | . . . |
| evtRepStabInd | boolean | O | 0 . . . 1 | This IE may be present if the trigger is set to "CONTINUOUS". When present and set to 1, it indicates the Event Type report shall be performed based on local stable timer. The local timer is started or reset each time when an event report is received. The 1st event report received is reported to server. Any subsequent event reports received while the timer is running are suppressed. The timer timeout, the last received event report is reported if there is change compare to last reported of the event. |
| praFilters | PresenceStatusFilter | O | 0 . . . 1 | Indicates the UE presence state(s) it wants to be notified about |

Figure 16:
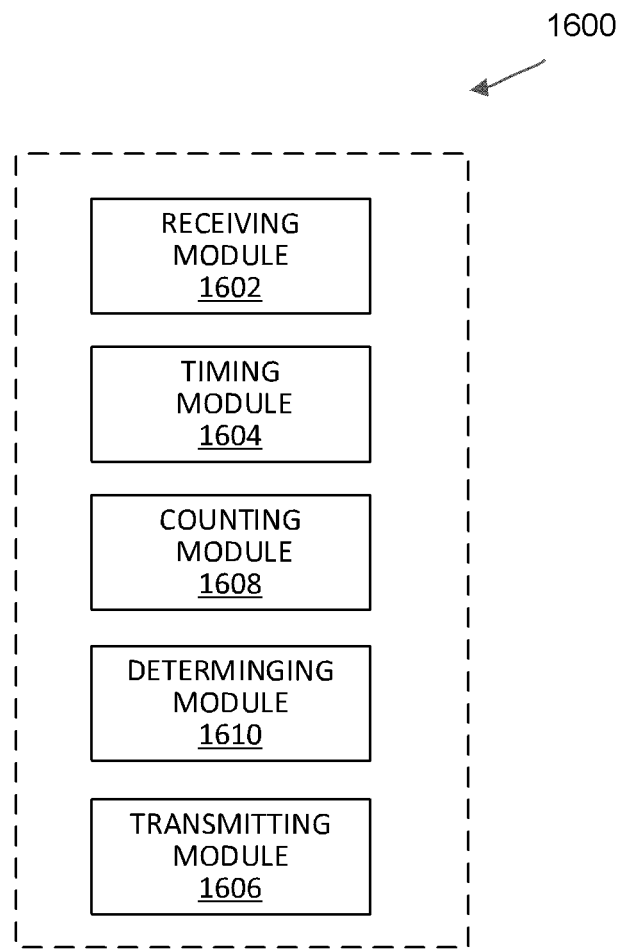
FIG. 16 illustratively shows a schematic structure diagram of a first NF node according to an exemplary embodiment of the present disclosure.

Hereinafter, a structure of a first NF node will be described with reference to FIG. 16. FIG. 16 illustratively shows a schematic structure diagram of a first NF node 1600 (e.g. AMF 903 and/or SMF 903 as shown in FIG. 9, AMF 1003 and/or SMF 1003 as shown in FIG. 10, AMF 1103 as shown in FIG. 11, AMF 1203 and/or SMF 1204 as shown in FIG. 12, AMF 1303 and/or SMF 1304 as shown in FIG. 13, and AMF 1503 and/or SMF 1504 as shown in FIG. 15 as described previously) according to an exemplary embodiment of the present disclosure. The first NF node 1600 in FIG. 16 may perform the method 500 for event report management described previously with reference to FIG. 5A, the method 500' for event report management described previously with reference to FIG. 5B and/or the method 700 for event report management described previously with reference to FIG. 7. Accordingly, some detailed description on the first NF node 1600 may refer to the corresponding description of the method 500, 500' for event report management and/or the corresponding description of the method 700 for event report management as previously discussed.

As shown in FIG. 16, the first NF node 1600 may include a receiving module 1602, a timing module 1604, and a transmitting module 1606. As will be understood by the skilled in the art, common components in the first NF node 1600 are omitted in FIG. 16 for not obscuring the idea of the present disclosure. Also, some modules may be distributed in more modules or integrated into fewer modules. For example, the receiving module 1602 and the transmitting module 1606 may be integrated into a transceiver module.

In an exemplary embodiment of the present disclosure, the receiving module 1602 of the first NF node 1600 may be configured to receive a first presence status report for a UE from a third NF node. The third NF node may be for example a RAN. The third NF node may also be NWDAF, NEF servers if the concepts of guard timer and praFilters are extended to other event types.

In an exemplary embodiment of the present disclosure, the timing module 1604 of the first NF node 1600 may be configured to start upon the receiving module 1602 receives a first presence status report for the UE.

In an exemplary embodiment of the present disclosure, the receiving module 1602 of the first NF node 1600 may be configured to receive a second presence status report for the UE from the third NF node. It is checked whether the timing module 1604 of the first NF node 1600 expires or not in response to receiving the second presence status report for the UE.

If it is checked out that the timing module 1604 expires, the transmitting module 1606 of the first NF node 1600 may be configured to transmit an even report corresponding to a latest presence status report received during the running of the timing module 1604 to a second NF node.

In an exemplary embodiment of the present disclosure, the receiving module 1602 of the first NF node 1600 may be configured to receive an indicator indicating a value of the timing module 1604 from the second NF node. That is, the value of the timing module 1604 is provisioned by the second NF node.

In an exemplary embodiment of the present disclosure, the value of the timing module 1604 is locally configured at the first NF node 1600.

In an exemplary embodiment of the present disclosure, the first NF node 1600 further comprises a counting module 1608 configured to count the suppressed event reports during the running of the timing module 1604. When the transmitting module 1606 of the first NF node 1600 transmits the event report corresponding to a latest presence status report received during the running of the timing module 1604, it includes a number of suppressed event reports counted by the counting module 1608 in the event report. The number of suppressed event reports is equal to the number of presence status reports for the UE received during the running of the timing module 1604.

In an exemplary embodiment of the present disclosure, the receiving module 1602 of the first NF node 1600 may be configured to receive an indication from the second NF node that the event report shall be performed when a presence state for the UE is stabilized. The first NF node 1600 uses the locally configured timing module upon receiving such an indication.

In an exemplary embodiment of the present disclosure, the presence status report indicates a presence state of the UE in a PRA and is received when the presence state of the UE in a PRA changes. The event report is a PRA report.

In an exemplary embodiment of the present disclosure, the transmitting module 1606 of the first NF node 1600 may be configured to transmit an event report corresponding to the first presence status report to the second NF node upon the receiving module 1602 receives the first presence status report for the UE.

In an exemplary embodiment of the present disclosure, the timing module 1604 of the first NF node 1600 may be configured to reset upon the receiving module 1602 receives a second presence status report for the UE during running of the timing module 1604. In an exemplary embodiment of the present disclosure, the counting module 1608 of the first NF node 1600 may be configured to count an event report stable time. The event report stable time is a length of time from starting of the report mute guard timer to expiration of the report mute guard timer. When the transmitting module 1606 of the first NF node 1600 transmits the event report corresponding to a latest presence status report received during the running of the timing module 1604, it includes the event report stable time counted by the counting module 1608 in the event report.

In an exemplary embodiment of the present disclosure, the receiving module 1602 of the first NF node 1600 may be configured to receive from the second NF node an event filtering indicator indicating a presence state of the UE which triggers an event report to the second NF node.

In an exemplary embodiment of the present disclosure, the first NF node 1600 may further comprise a determining module 1610 configured to determine whether the UE is in the presence state indicated by the event filtering indicator when the receiving module 1602 of the first NF node 1600 receives a presence status report of the UE.

If the UE is in the presence state indicated by the event filtering indicator, that is, the UE is in a presence state which triggers an event report, the transmitting module 1606 of the first NF node 1600 may be configured to transmit an event report corresponding to the presence status report to the second NF. If the UE is not in the presence state indicated by the event filtering indicator, no event report will be transmitted for the received presence status report of the UE.

In an exemplary embodiment of the present disclosure, when the timing module 1604 expires, the transmitting module 1606 of the first NF node 1600 may be configured to transmit an even report corresponding to a latest presence status report received during the running of the timing module 1604 to the second NF node if the latest present status report and the first presence status report indicate different presence states of the UE.

Figure 17:
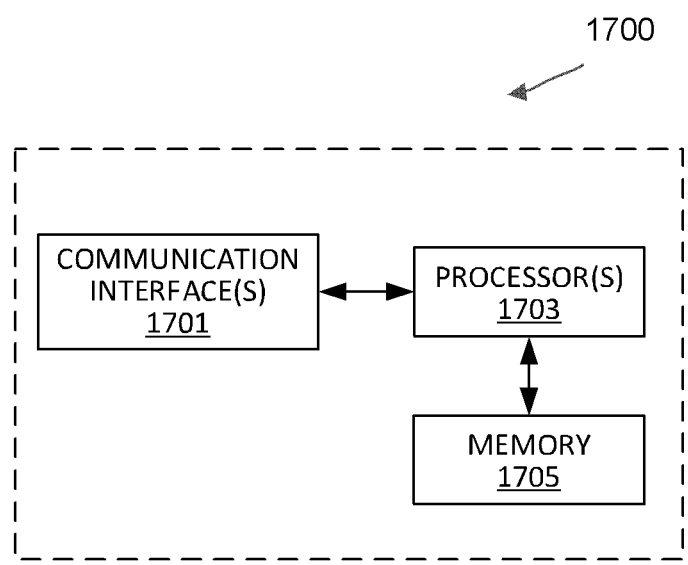
FIG. 17 illustratively shows a schematic structure diagram of a first NF node according to an exemplary embodiment of the present disclosure.

Hereinafter, another structure of a first NF node 1700 will be described with reference to FIG. 17. FIG. 17 illustratively shows a schematic structure diagram of a first NF node 1700 (e.g., AMF 903 and/or SMF 903 as shown in FIG. 9, AMF 1003 and/or SMF 1003 as shown in FIG. 10, AMF 1103 as shown in FIG. 11, AMF 1203 and/or SMF 1204 as shown in FIG. 12, AMF 1303 and/or SMF 1304 as shown in FIG. 13, and AMF 1503 and/or SMF 1504 as shown in FIG. 15 as described previously) according to an exemplary embodiment of the present disclosure. The first NF node 1700 in FIG. 17 may perform the method 500 for event report management described previously with reference to FIG. 5A, the method 500' for event report management described previously with reference to FIG. 5B and/or the method 700 for event report management described previously with reference to FIG. 7. Accordingly, some detailed description on the first NF node 1700 may refer to the corresponding description of the method 500, 500' for event report management and/or the corresponding description of the method 700 for event report management as previously discussed.

As shown in FIG. 17, the first NF node 1700 may include at least one controller or processor 1703 including e.g., any suitable Central Processing Unit, CPU, microcontroller, Digital Signal Processor, DSP, etc., capable of executing computer program instructions. The computer program instructions may be stored in a memory 1705. The memory 1705 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The exemplary first NF node 1700 further comprises a communication interface 1701 arranged for communication.

The instructions, when loaded from the memory 1705 and executed by the at least one processor 1703, may cause the first NF node 1700 to perform the methods 500 and 500' for event report management and/or the method 700 for event report management as previously discussed.

In particular, in an exemplary embodiment of the present disclosure, the instructions, when loaded from the memory 1705 and executed by the at least one processor 1703, may cause the first NF node 1700 to receive a first presence status report for a UE from a third NF node. The third NF node may be for example a RAN. The third NF node may also be NWDAF, NEF servers if the concepts of guard timer and praFilters are extended to other event types.

In an exemplary embodiment of the present disclosure, the instructions, when loaded from the memory 1705 and executed by the at least one processor 1703, may cause the first NF node 1700 to start a report mute guard timer upon receiving a first presence status report for the UE.

In an exemplary embodiment of the present disclosure, the instructions, when loaded from the memory 1705 and executed by the at least one processor 1703, may cause the first NF node 1700 to check whether the report mute guard timer expires or not in response to receiving a second presence status report for the UE from the third NF node.

In an exemplary embodiment of the present disclosure, the instructions, when loaded from the memory 1705 and executed by the at least one processor 1703, may cause the first NF node 1700 to transmit an even report corresponding to a latest presence status report received during the running of the report mute guard timer to a second NF node when the report mute guard timer expires.

In an exemplary embodiment of the present disclosure, the instructions, when loaded from the memory 1705 and executed by the at least one processor 1703, may cause the first NF node 1700 to receive an indicator indicating a value of the report mute guard timer from the second NF node. That is, the report mute guard timer is provisioned by the second NF node.

In an exemplary embodiment of the present disclosure, the report mute guard timer is locally configured at the first NF node 1700.

In an exemplary embodiment of the present disclosure, the instructions, when loaded from the memory 1705 and executed by the at least one processor 1703, may cause the first NF node 1700 to count the suppressed event reports during the running of the report mute guard timer, and include a number of the suppressed event reports in the transmitted event report. The number of suppressed event reports is equal to the number of presence status reports for the UE received during the running of the report mute guard timer.

In an exemplary embodiment of the present disclosure, the instructions, when loaded from the memory 1705 and executed by the at least one processor 1703, may cause the first NF node 1700 to receive an indication from the second NF node that the event report shall be performed when a presence state for the UE is stabilized. The first NF node 1700 uses the locally configured report mute guard timer upon receiving such an indication.

In an exemplary embodiment of the present disclosure, the instructions, when loaded from the memory 1705 and executed by the at least one processor 1703, may cause the first NF node 1700 to transmit an event report corresponding to the first presence status report to the second NF node upon receiving the first presence status report for the UE.

In an exemplary embodiment of the present disclosure, the instructions, when loaded from the memory 1705 and executed by the at least one processor 1703, may cause the first NF node 1700 to reset the report mute guard timer upon receiving a second presence status report for the UE during running of the report mute guard timer.

In an exemplary embodiment of the present disclosure, the instructions, when loaded from the memory 1705 and executed by the at least one processor 1703, may cause the first NF node 1700 to count an event report stable time. The event report stable time is a length of time from starting of the report mute guard timer to expiration of the report mute guard timer. The first NF node 1700 may include the event report stable time in the transmitted event report corresponding to a latest presence status report received during the running of the report mute guard timer.

In an exemplary embodiment of the present disclosure, the instructions, when loaded from the memory 1705 and executed by the at least one processor 1703, may cause the first NF node 1700 to receive from the second NF node an event filtering indicator indicating a presence state of the UE which triggers an event report to the second NF node.

In an exemplary embodiment of the present disclosure, the instructions, when loaded from the memory 1705 and executed by the at least one processor 1703, may cause the first NF node 1700 to determine whether the UE is in the presence state indicated by the event filtering indicator when the first NF node 1700 receives a presence status report of the UE.

In an exemplary embodiment of the present disclosure, the instructions, when loaded from the memory 1705 and executed by the at least one processor 1703, may cause the first NF node 1700 to transmit an event report corresponding to the presence status report to the second NF if the UE is in the presence state indicated by the event filtering indicator, that is, the UE is in a presence state which triggers an event report. If the UE is not in the presence state indicated by the event filtering indicator, no event report will be transmitted for the received presence status report of the UE.

In an exemplary embodiment of the present disclosure, the instructions, when loaded from the memory 1705 and executed by the at least one processor 1703, may cause the first NF node 1700 to transmit an even report corresponding to a latest presence status report received during the running of the report mute guard timer to the second NF node if the latest present status report and the first presence status report indicate different presence states of the UE.

Figure 18:
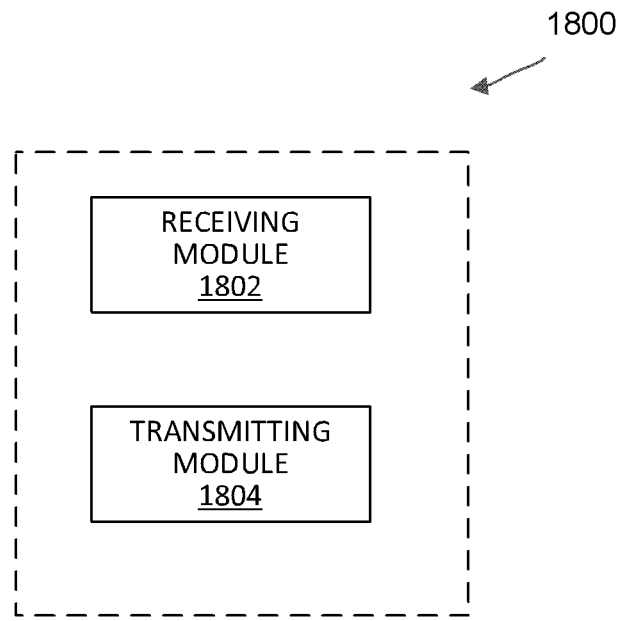
FIG. 18 illustratively shows a schematic structure diagram of a second NF node according to an exemplary embodiment of the present disclosure.

Hereinafter, a structure of a second NF node will be described with reference to FIG. 18. FIG. 18 illustratively shows a schematic structure diagram of a second NF node 1800 (e.g. PCF 906 and/or CHF 907 as shown in FIG. 9, PCF 1006 and/or CHF 1007 as shown in FIG. 10, PCF 1106 as shown in FIG. 11, PCF 1206 as shown in FIG. 12, PCF 1306 as shown in FIG. 13, and PCF 1506 as shown in FIG. 15 as described previously) according to an exemplary embodiment of the present disclosure. The second NF node 1800 in FIG. 18 may perform the method 600 for event report management described previously with reference to FIG. 6 and/or the method 800 for event report management described previously with reference to FIG. 8. Accordingly, some detailed description on the second NF node 1800 may refer to the corresponding description of the method 600 for event report management and/or the corresponding description of the method 800 for event report management as previously discussed.

As shown in FIG. 18, the second NF node 1800 may include a receiving module 1802 and a transmitting module 1804. As will be understood by the skilled in the art, common components in the second NF node 1800 are omitted in FIG. 18 for not obscuring the idea of the present disclosure. Also, some modules may be distributed in more modules or integrated into fewer modules. For example, the receiving module 1802 and the transmitting module 1804 may be integrated into a transceiver module.

In an exemplary embodiment of the present disclosure, the transmitting module 1804 of the second NF node 1800 may be configured to transmit an indicator indicating that the second NF node 1800 supports a report mute feature to a first NF node.

In an exemplary embodiment of the present disclosure, the indicator may be an indicator indicating a value of a report mute guard timer for the event report. By provisioning explicitly a report mute guard timer, the first NF node knows that the second NF node supports a report mute feature, and may provide an event report by applying the report mute guard timer. In an exemplary embodiment of the present disclosure, the report mute guard timer is provided for each PRA, all PRAs, per UE or a group or UE, or per Public Data Network, PDN.

In an exemplary embodiment of the present disclosure, the indicator may be an indication that the event report shall be performed when a presence state for the UE is stabilized. By providing such an indication, the first NF node knows that the second NF node supports a report mute feature, and may provide an event report by applying a report mute guard timer that is locally configured at the first NF node.

In an exemplary embodiment of the present disclosure, the receiving module 1802 of the second NF node 1800 may be configured to receive an event report from the first NF node.

In an exemplary embodiment of the present disclosure, the event report comprises a number of suppressed event reports, wherein the number of suppressed event reports is equal to a number of event reports for the UE that otherwise would be transmitted from the first NF without the report mute feature. The second NF node 1800 can use the number of suppressed event reports in for example, network tuning and network planning.

In an exemplary embodiment of the present disclosure, the event report further comprises an event report stable time, wherein the event report stable time is a length of time from the time when the first NF node transmits a previous event report to the time when the first NF node transmits the current event report. The second NF node can use the number of suppressed event reports in for example, network tuning and network planning.

In an exemplary embodiment of the present disclosure, the transmitting module 1804 of the second NF node 1800 may be configured to transmit to the first NF node an event filtering indicator indicating a presence state of the UE which triggers the event report to the second NF node 1800.

In an exemplary embodiment of the present disclosure, the event filtering indicator is an event filtering list listing more than one presence state of the UE which trigger an event report to the second NF node.

Figure 19:
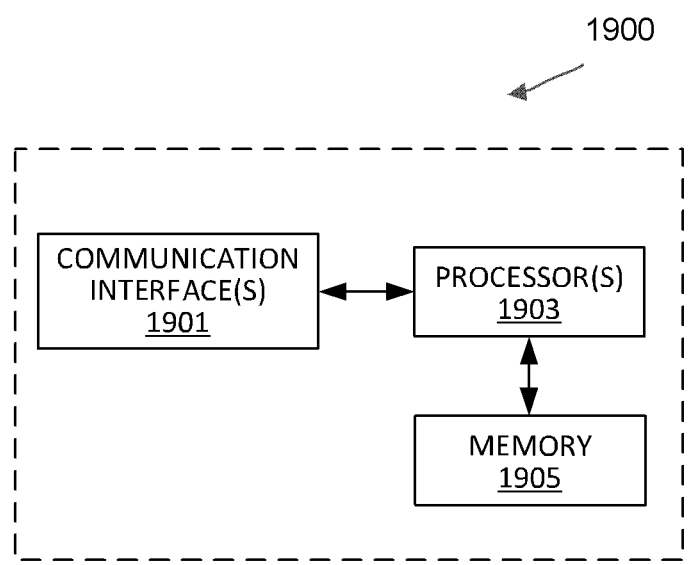
FIG. 19 illustratively shows a schematic structure diagram of a second NF node according to an exemplary embodiment of the present disclosure.

Hereinafter, another structure of a second NF node will be described with reference to FIG. 19. FIG. 19 illustratively shows a schematic structure diagram of a second NF node 1900 (e.g., PCF 906 and/or CHF 907 as shown in FIG. 9, PCF 1006 and/or CHF 1007 as shown in FIG. 10, PCF 1106 as shown in FIG. 11, PCF 1206 as shown in FIG. 12, PCF 1306 as shown in FIG. 13, and PCF 1506 as shown in FIG. 15) according to an exemplary embodiment of the present disclosure. The second NF node 1900 in FIG. 19 may perform the method 600 for event report management described previously with reference to FIG. 6 and/or the method 800 for event report management described previously with reference to FIG. 8. Accordingly, some detailed description on the second NF node 1900 may refer to the corresponding description of the method 600 for event report management and/or the corresponding description of the method 800 for event report management as previously discussed.

As shown in FIG. 19, the second NF node 1900 may include at least one controller or processor 1903 including e.g., any suitable Central Processing Unit, CPU, microcontroller, Digital Signal Processor, DSP, etc., capable of executing computer program instructions. The computer program instructions may be stored in a memory 1905. The memory 1905 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The exemplary second NF node 1900 further comprises a communication interface 1901 arranged for communication.

The instructions, when loaded from the memory 1905 and executed by the at least one processor 1903, may cause the second NF node 1900 to perform the method 600 for event report management described previously with reference to FIG. 6 and/or the method 800 for event report management described previously with reference to FIG. 8.

In particular, in an exemplary embodiment of the present disclosure, the instructions, when loaded from the memory 1905 and executed by the at least one processor 1903, may cause the second NF node 1900 to transmit an indicator indicating that the second NF node 1900 supports a report mute feature to a first NF node.

In an exemplary embodiment of the present disclosure, the indicator may be an indicator indicating a value of a report mute guard timer for the event report. By provisioning explicitly a report mute guard timer, the first NF node knows that the second NF node supports a report mute feature, and may provide an event report by applying the report mute guard timer. In an exemplary embodiment of the present disclosure, the report mute guard timer is provided for each PRA, all PRAs, per UE or a group or UE, or per Public Data Network, PDN.

In an exemplary embodiment of the present disclosure, the indicator may be an indication that the event report shall be performed when a presence state for the UE is stabilized. By providing such an indication, the first NF node knows that the second NF node supports a report mute feature, and may provide an event report by applying a report mute guard timer that is locally configured at the first NF node.

In an exemplary embodiment of the present disclosure, the instructions, when loaded from the memory 1905 and executed by the at least one processor 1903, may cause the second NF node 1900 to receive an event report from the first NF node.

In an exemplary embodiment of the present disclosure, the event report comprises a number of suppressed event reports, wherein the number of suppressed event reports is equal to a number of event reports for the UE that otherwise would be transmitted from the first NF without the report mute feature. The second NF node 1900 can use the number of suppressed event reports in for example, network tuning and network planning.

In an exemplary embodiment of the present disclosure, the event report further comprises an event report stable time, wherein the event report stable time is a length of time from the time when the first NF node transmits a previous event report to the time when the first NF node transmits the current event report. The second NF node can use the number of suppressed event reports in for example, network tuning and network planning.

In an exemplary embodiment of the present disclosure, the instructions, when loaded from the memory 1905 and executed by the at least one processor 1903, may cause the second NF node 1900 to transmit to the first NF node an event filtering indicator indicating a presence state of the UE which triggers the event report to the second NF node 1900.

In an exemplary embodiment of the present disclosure, the event filtering indicator is an event filtering list listing more than one presence state of the UE which trigger an event report to the second NF node.

The foregoing description of implementations provides illustration and description, but is not intended to be exhaustive or to limit the disclosure to the precise form disclosed. Modifications and variations are possible in light of the above teachings, or may be acquired from practice of the disclosure. The sequences of steps shown in the embodiments are not limited thereto, and steps can be performed in any order as long as there is no conflict.

Aspects of the disclosure may also be embodied as methods and/or computer program products. Accordingly, the disclosure may be embodied in hardware and/or in hardware/software (including firmware, resident software, microcode, etc.). Furthermore, the embodiments may take the form of a computer program product on a computer-usable or computer-readable storage medium having computer-usable or computer-readable program code embodied in the medium for use by or in connection with an instruction execution system. Such instruction execution system may be implemented in a standalone or distributed manner. The actual software code or specialized control hardware used to implement embodiments described herein is not limiting of the disclosure. Thus, the operation and behavior of the aspects were described without reference to the specific software code, it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A method implemented at a first Network Function, NF, node for providing an event exposure service for a User Equipment, UE, to a second NF node which subscribes the event exposure service, the method comprising:
    starting a report mute guard timer upon receiving a first presence status report for the UE from a third NF node;
    avoiding a transmission of an event report to the second NF node while the report mute timer is running; and
    transmitting an event report corresponding to a latest presence status report received during the running of the report mute guard timer to the second NF node when the report mute guard timer expires, transmitting the event report corresponding to a latest presence status report received during the running of the report mute guard timer to the second NF node comprising:
        transmitting an event report comprising a number of suppressed event reports, the number of suppressed event reports being equal to a number of presence status reports for the UE received during the running of the report mute guard timer.

2. The method of claim 1, wherein before the step of starting a report mute guard timer, the method further comprises:
    receiving an indicator indicating a value of the report mute guard timer from the second NF node.

3. The method of claim 1, wherein before the step of starting a report mute guard timer, the method further comprises:
    configuring the report mute guard timer at the first NF node locally.

4. The method of claim 1,
    wherein the step of starting a report mute guard timer upon receiving a first presence status report for the UE comprises:
        transmitting an event report corresponding to the first presence status report to the second NF node upon receiving the first presence status report for the UE;
    wherein the step of avoiding a transmission of an event report to the second NF node while the report mute timer is running comprises:
        resetting the report mute guard timer upon receiving another presence status report for the event when the report mute guard timer is running, and
        avoiding a transmission of an event report corresponding to the other presence status report to the second NF node; and
    wherein the step of transmitting an event report corresponding to a latest presence status report received during the running of the report mute guard timer to the second NF node when the report mute guard timer expires comprises:
        transmitting the event report corresponding to the latest presence status report received during the running of the report mute guard timer to the second NF node when the first presence status report and the latest presence status report indicate different presence states of the UE.

5. The method of claim 4, wherein the step of transmitting an event report corresponding to a latest presence status report received during the running of the report mute guard timer to the second NF node comprises:
    transmitting an event report comprising an event report stable time, wherein the event report stable time is a length of time from starting of the report mute guard timer to expiration of the report mute guard timer.

6. The method of claim 2, wherein when more than one indicator indicating a different value of the report mute guard timer is received from more than one second NF node, the value of the report mute guard timer used for the event report is the smallest one of the values.

7. The method of claim 1, wherein when an indicator indicating a value of the report mute guard timer is received from the second NF node, and a report mute guard timer is locally configured at the first NF node, which timer is used for the event report is determined at least partially based on an operator policy if configured in the first NF node.

8. The method of claim 3, wherein the report mute guard timer locally configured at the first NF node is used when the first NF node receives an indication from the second NF node that the event report shall be performed when a presence state for the UE is stabilized.

9. The method of claim 1, wherein the presence status report indicates a presence state of the UE in a Presence Reporting Area, PRA, and is received when the presence state of the UE in a PRA changes, and the event report is a PRA report.

10. The method of claim 9, wherein the report mute guard timer is provided for:
- each PRA;
- all PRAS;
- per UE or a group or UE; or
- per Public Data Network, PDN.

11. A method implemented at a first Network Function, NF, node for providing an event exposure service for a User Equipment, UE, to a second NF node which subscribes the event exposure service, the method comprising:
- receiving from the second NF node an event filtering indicator indicating a presence state of the UE which triggers an event report to the second NF node, the event filtering indicator being an event filtering list listing more than one presence state of the UE which triggers an event report to the second NF node;
- in response to receiving a presence status report of the UE from a third NF node, matching a presence state of the UE indicated by the presence status report with the presence state of the UE indicated by the event filtering indicator; and
- transmitting the event report corresponding to the presence status report to the second NF when the present state of the UE indicated by the presence status report matches with the presence state of the UE indicated by the event filtering indicator.

12. The method of claim 11, wherein the presence status report indicates a presence state of the UE in a Presence Reporting Area, PRA, and the presence state of the UE comprises one or more of the following:
- the UE is inside or enters the PRA;
- the UE is outside or leaves the PRA;
- it is unknown whether or not the UE is in the PRA; or
- the PRA is inactive in the third NF node.

13. A method at a second Network Function, NF, node for managing an event report for an event exposure service for a User Equipment, UE, from a first NF node which provides the event exposure service, the method comprising:
- transmitting an indicator to the first NF node indicating that the second NF node supports a report mute feature; and
- receiving from the first NF node an event report comprising a number of suppressed event reports, the number of suppressed event reports being equal to a number of event reports for the UE that otherwise would be transmitted from the first NF without the report mute feature, the event report further comprising an event report stable time, the event report stable time being a length of time from the time when the first NF node transmits a previous event report to the time when the first NF node transmits the current event report.

14. The method of claim 13, wherein the step of transmitting an indicator to the first NF node indicating that the second NF node supports a report mute feature comprises:
- transmitting an indicator indicating a value of a report mute guard timer for the event report to the first NF node.

15. The method of claim 13, wherein the step of transmitting an indicator to the first NF node indicating that the second NF node supports a report mute feature comprises:
- transmitting an indication that the event report shall be performed when a presence state for the UE is stabilized.

16. The method of claim 14, wherein the report mute guard timer is provided for:
- each PRA;
- all PRAs;
- per UE or a group or UE; or
- per Public Data Network, PDN.

17. A method implemented at a second Network Function, NF, node for managing an event report for an event exposure service for a User Equipment, UE, from a first NF node which provides the event exposure service, the method comprising:
- transmitting to the first NF node an event filtering indicator indicating a presence state of the UE which triggers the event report to the second NF node; and
- receiving from the first NF node an event report comprising a number of suppressed event reports, the number of suppressed event reports being equal to a number of event reports for the UE that otherwise would be transmitted from the first NF without the report mute feature, the event report further comprising an event report stable time, the event report stable time being a length of time from the time when the first NF node transmits a previous event report to the time when the first NF node transmits the current event report.

18. The method of claim 11, further comprising receiving an indicator from the second NF node indicating a value of a report mute guard timer for the event report.

* * * * *